(12) United States Patent
Wong et al.

(10) Patent No.: US 11,363,076 B2
(45) Date of Patent: *Jun. 14, 2022

(54) HIGH-DEFINITION VOICE FOR FIXED MOBILE CONVERGENCE ON MOBILE AND WIRELINE NETWORKS

(71) Applicant: AT&T Intellectual Property I, L.P., Atlanta, GA (US)

(72) Inventors: Tony Wah-Tung Wong, Dallas, TX (US); Gregory Johnson, Frisco, TX (US); Elaine Kung, Dallas, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 104 days.

This patent is subject to a terminal disclaimer.

(21) Appl. No.: 16/824,740

(22) Filed: Mar. 20, 2020

(65) Prior Publication Data

US 2020/0220904 A1 Jul. 9, 2020

Related U.S. Application Data

(63) Continuation of application No. 15/851,274, filed on Dec. 21, 2017, now Pat. No. 10,601,877.

(51) Int. Cl.
*H04M 3/42* (2006.01)
*H04M 1/57* (2006.01)
(Continued)

(52) U.S. Cl.
CPC .......... *H04L 65/102* (2013.01); *H04L 1/0014* (2013.01); *H04L 65/1083* (2013.01);
(Continued)

(58) Field of Classification Search
None
See application file for complete search history.

(56) References Cited

U.S. PATENT DOCUMENTS 6,993,360 B2 * 1/2006 Plahte .............. H04M 3/42314
455/555
7,801,543 B2 9/2010 Kasper et al.
(Continued)

OTHER PUBLICATIONS

U.S. Office Action dated Jul. 10, 2019 in U.S. Appl. No. 15/851,274.
(Continued)

*Primary Examiner* — Sai Aung
(74) *Attorney, Agent, or Firm* — Hartman & Citrin LLC

(57) ABSTRACT

Concepts and technologies provided herein can provide high-definition voice for fixed mobile convergence on mobile and wireline networks. A processor executing instructions can detect a call request associated with a called telephone number to setup a call session, where the call request is initiated from a calling device associated with an originating network. The processor can determine a call path for the call session from the originating network to a receiving network. The processor can create a fixed mobile convergence request to alert an electronic number mapping system of the call path for the call session from the originating network to the receiving network. The electronic number mapping system can provide a network presence map identifying a plurality of call receiving devices associated with the called telephone number that are available to participate in the call session via the receiving network.

20 Claims, 5 Drawing Sheets

(51) Int. Cl.
    *H04L 29/06*     (2006.01)
    *H04L 65/102*     (2022.01)
    *H04L 1/00*     (2006.01)
    *H04M 7/00*     (2006.01)
    *H04L 65/1083*     (2022.01)

(52) U.S. Cl.
    CPC ....... *H04M 3/4228* (2013.01); *H04M 7/0072* (2013.01); *H04M 2203/2044* (2013.01)

(56) References Cited

U.S. PATENT DOCUMENTS

| | | | |
|---|---|---|---|
| 8,275,415 | B2 | 9/2012 | Huslak |
| 8,611,951 | B2 | 12/2013 | So et al. |
| 8,688,095 | B2 | 4/2014 | Rice |
| 9,014,091 | B2 | 4/2015 | Sajadieh |
| 9,277,588 | B2 | 3/2016 | Sajadieh et al. |
| 9,313,646 | B2 | 4/2016 | Baldwin |
| 9,544,074 | B2 | 1/2017 | Li et al. |
| 9,763,132 | B2 | 9/2017 | Poltorak et al. |
| 2009/0221265 | A1* | 9/2009 | Liu .............. H04L 63/0853 455/411 |
| 2011/0217966 | A1* | 9/2011 | McDonald ............ H04W 12/06 455/416 |
| 2013/0252595 | A1* | 9/2013 | Mairs ................ H04L 65/1089 455/415 |
| 2016/0021545 | A1* | 1/2016 | Shaw ................ H04M 15/8214 455/405 |
| 2016/0150413 | A1* | 5/2016 | Meredith .............. H04M 15/47 455/410 |
| 2016/0277387 | A1 | 9/2016 | DeWeese et al. |
| 2017/0048327 | A1 | 2/2017 | Dowlatkhah et al. |
| 2017/0331946 | A1* | 11/2017 | Mumick ............... H04M 15/85 |
| 2018/0007587 | A1* | 1/2018 | Feldman .............. H04L 65/1016 |
| 2018/0160291 | A1* | 6/2018 | Burgert .................. H04W 8/12 |

OTHER PUBLICATIONS

U.S. Notice of Allowance dated Nov. 1, 2019 in U.S. Appl. No. 15/851,274.

* cited by examiner

HIGH-DEFINITION VOICE FOR FIXED MOBILE CONVERGENCE ON MOBILE AND WIRELINE NETWORKS

CROSS-REFERENCE TO RELATED APPLICATIONS

This application is a continuation of and claims priority to U.S. patent application Ser. No. 15/851,274, entitled "High-Definition Voice for Fixed Mobile Convergence on Mobile and Wireline Networks," filed Dec. 21, 2017, now U.S. Pat. No. 10,601,877, which is incorporated herein by reference in its entirety.

BACKGROUND

In some network operating environments, mobile communication devices may connect to a communications network via a subscription to a wireless communication service. The wireless communication service provider may provide the subscriber with a Subscriber Identity Module (SIM) card that is conventionally assigned a single telephone number. Historically, when a subscriber would prefer to have multiple telephone numbers, such as one for business use and one for personal use, the subscriber would have to buy multiple communication devices, where each device would have a single SIM card assigned a separate telephone number. Attempts have been made to use multiple SIM cards on a single mobile communication device, however multiple SIM cards in a single mobile device can increase power consumption, increase the physical size of the phone, decrease battery life of the mobile communication device, and increase the cost of manufacturing and servicing the mobile communication device. Additionally, in conventional operating environments, when a mobile communication device attempts to engage in a call session with a fixed communication device, voice quality between the devices can be degraded due to a conventional communications network defaulting to a static transcoding scheme. Moreover, conventional network environments that support IP-based calls (e.g., Voice over Internet Protocol (VoIP) calls, and/or Voice over Wireless Fidelity (VoWiFi) calls) may have difficulty identifying a geolocation of a subscriber, lack compliance to a Federal Communications Commission (FCC) 911 mandate, and limit call handover capabilities for providing a continuous session during a VoWiFi call from a mobile network to a WiFi network.

SUMMARY

Concepts and technologies disclosed herein are directed to providing high-definition voice for fixed mobile convergence on mobile and/or wireline networks. According to one aspect of the concepts and technologies disclosed herein, a method for fixed mobile convergence on mobile and/or wireline networks is disclosed. The method can include detecting, by a system executing within an originating network, a call request associated with a called telephone number to setup a call session. The call request can be initiated from a calling device associated with the originating network. In some embodiments, the originating network can include an internet protocol multimedia subsystem and an evolved packet core network. The method also can include determining, by the system within the originating network, a call path for the call session from the originating network to a receiving network. In some embodiments, the receiving network can include at least one of a voice over internet protocol network and a public switched telephone network. The method further can include creating, by the system within the originating network, a fixed mobile convergence request to alert an electronic number mapping system of the call path for the call session from the originating network to the receiving network. The electronic number mapping system can provide a network presence map identifying a plurality of call receiving devices associated with the called telephone number that are available to participate in the call session via the receiving network.

In some embodiments, the method also can include preparing, by the system within the originating network, a calling vocoder list identifying at least one calling vocoder that is supported by the calling device. The method can include negotiating, via the originating network and the receiving network, vocoder selection between the calling device and each of the plurality of call receiving devices prior to one of the plurality of call receiving devices participating in the call session.

In some embodiments, the operation of negotiating vocoder selection between the calling device and each of the plurality of call receiving devices can include providing, from the originating network, the network presence map and the calling vocoder list to a network gateway border element of the receiving network. The operation of negotiating vocoder selection between the calling device and each of the plurality of call receiving devices also can include obtaining, from the receiving network, a called vocoder list identifying called vocoders that are supported by the plurality of call receiving devices. The operation of negotiating vocoder selection between the calling device and each of the plurality of call receiving devices also can include assigning, by the system of the originating network, a respective calling vocoder to each call receiving device of the plurality of call receiving devices based on the called vocoder list. In some embodiments, the respective calling vocoder being assigned for each call receiving device of the plurality of call receiving devices can be based on an amount of transcoding iterations that would occur along the call path between the originating network and the receiving network.

In some embodiments, the method also can include identifying, from the receiving network, the call receiving device that will participate in the call session. The method can include activating, via the originating network, the respective calling vocoder for the calling device to use during the call session with the call receiving device that will participate in the call session. In some embodiments, the method also can include tracking, via the electronic number mapping system, at least one of the plurality of call receiving devices associated with the called telephone number to update the network presence map. The method also can include determining, via the electronic number mapping system, that a new call receiving device is being requested for use during the call session. The method further can include renegotiating, between the originating network and the receiving network, vocoder selection for the calling device and the new call receiving device based on the respective calling vocoder in use during the call session.

According to another aspect of the concepts and technologies disclosed herein, a system is disclosed. In some instances, the system can be resident within an originating network that can communicatively couple with a calling device. The system can include a processor and a memory. The memory stores computer-executable instructions that, in response to being executed by the processor, cause the processor to perform operations. The operations can include detecting a call request associated with a called telephone number to setup a call session. The call request can be initiated from a calling device associated with an originating network. In some embodiments, the originating network can include an internet protocol multimedia subsystem and an evolved packet core network. The operations also can include determining a call path for the call session from the originating network to a receiving network. In some embodiments, the receiving network can include at least one of a voice over internet protocol network and a public switched telephone network. The operations can include creating a fixed mobile convergence request to alert an electronic number mapping system of the call path for the call session from the originating network to the receiving network. The electronic number mapping system can provide a network presence map identifying a plurality of call receiving devices associated with the called telephone number that are available to participate in the call session via the receiving network.

In some embodiments, the operation also can include preparing a calling vocoder list identifying at least one calling vocoder that is supported by the calling device, and negotiating vocoder selection between the calling device and each of the plurality of call receiving devices prior to one of the plurality of call receiving devices participating in the call session.

In some embodiments, negotiating vocoder selection between the calling device and each of the plurality of call receiving devices can include providing the network presence map and the calling vocoder list to a network gateway border element of the receiving network. Negotiating vocoder selection between the calling device and each of the plurality of call receiving devices also can include obtaining a called vocoder list identifying called vocoders that are supported by the plurality of call receiving devices, and assigning a respective calling vocoder to each call receiving device of the plurality of call receiving devices based on the called vocoder list. In some embodiments, the respective calling vocoder being assigned for each call receiving device of the plurality of call receiving devices is based on an amount of transcoding iterations that would occur along the call path between the originating network and the receiving network.

In some embodiments, the operations can further include identifying the call receiving device that will participate in the call session, and activating the respective calling vocoder for the calling device to use during the call session with the call receiving device that will participate in the call session. In some embodiments, the operations also can include tracking at least one of the plurality of call receiving devices associated with the called telephone number to update the network presence map, determining that a new call receiving device is being requested for use during the call session, and renegotiating vocoder selection for the calling device and the new call receiving device based on the respective calling vocoder in use during the call session.

According to yet another aspect, a computer storage medium is disclosed. The computer storage medium can have computer-executable instructions stored thereon. When the computer-executable instructions are executed by a processor, the processor can perform operations. The operations can include detecting a call request associated with a called telephone number to setup a call session. The call request can be initiated from a calling device associated with an originating network. The originating network can include an internet protocol multimedia subsystem and an evolved packet core network. The operations also can include determining a call path for the call session from the originating network to a receiving network. The receiving network can include at least one of a voice over internet protocol network and a public switched telephone network. The operation also can include creating a fixed mobile convergence request to alert an electronic number mapping system of the call path for the call session from the originating network to the receiving network. The electronic number mapping system can provide a network presence map identifying a plurality of call receiving devices associated with the called telephone number that are available to participate in the call session via the receiving network.

In some embodiments, the operations can include preparing a calling vocoder list identifying at least one calling vocoder that is supported by the calling device, and negotiating vocoder selection between the calling device and each of the plurality of call receiving devices prior to one of the plurality of call receiving devices participating in the call session. In some embodiments, negotiating vocoder selection between the calling device and each of the plurality of call receiving devices can include providing the network presence map and the calling vocoder list to a network gateway border element of the receiving network. Negotiating vocoder selection between the calling device and each of the plurality of call receiving devices also can include obtaining a called vocoder list identifying called vocoders that are supported by the plurality of call receiving devices, and assigning a respective calling vocoder to each call receiving device of the plurality of call receiving devices based on the called vocoder list. In some embodiments, the respective calling vocoder being assigned for each call receiving device of the plurality of call receiving devices can be based on an amount of transcoding iterations that would occur along the call path between the originating network and the receiving network.

In some embodiments, the operations further can include identifying the call receiving device that will participate in the call session and activating the respective calling vocoder for the calling device to use during the call session with the call receiving device that will participate in the call session. The operations also can include tracking for at least one of the plurality of call receiving devices associated with the called telephone number to update the network presence map, determining that a new call receiving device is being requested for use during the call session, and renegotiating vocoder selection for the calling device and the new call receiving device based on the respective calling vocoder in use during the call session.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
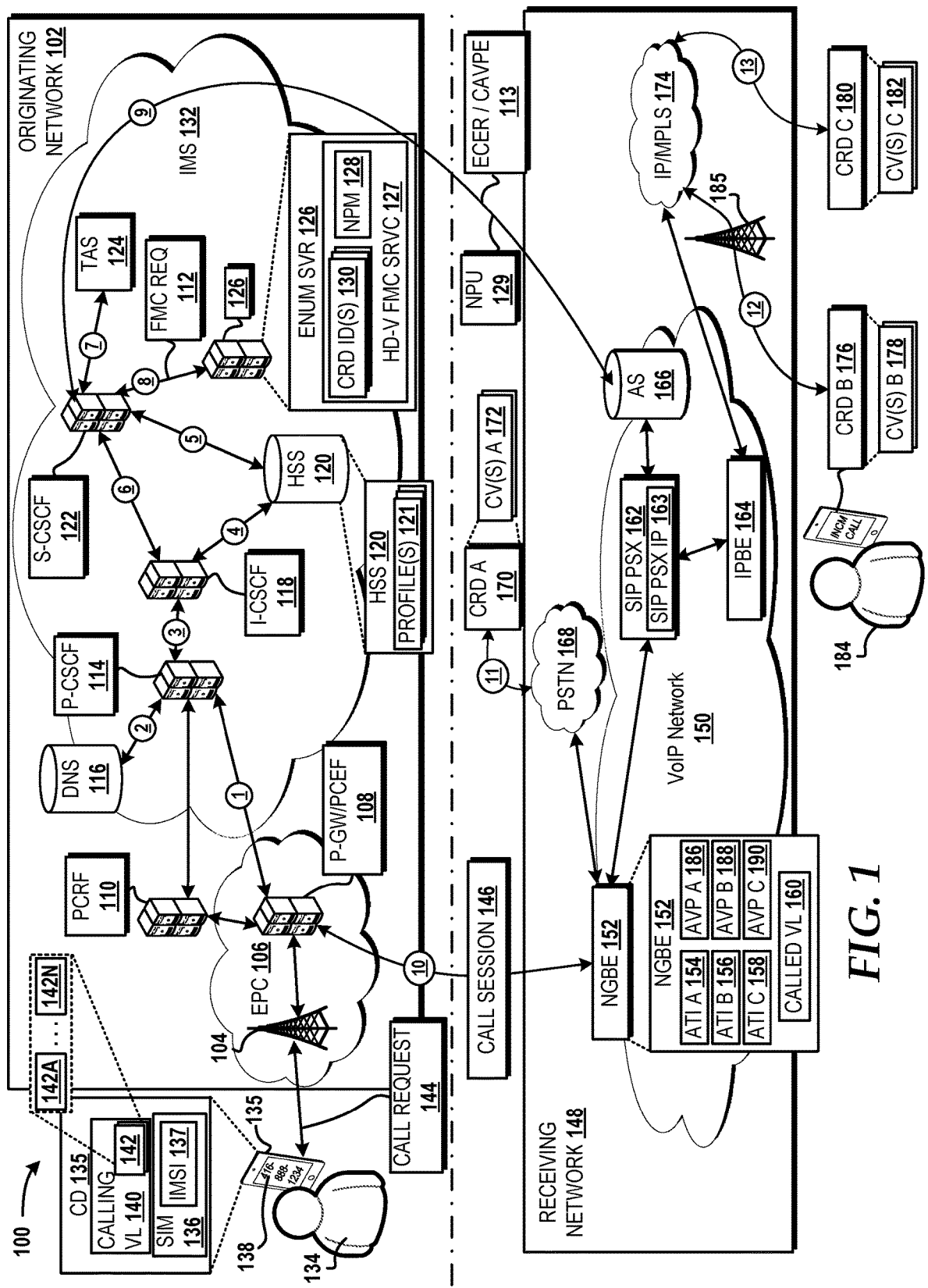
FIG. 1 is a block diagram illustrating aspects of an operating environment that includes a system for providing high-definition voice for fixed mobile convergence on mobile and wireline networks according to an embodiment of the present disclosure.

As the use of mobile computing devices becomes more prevalent, call sessions can occur between mobile communications (e.g., a smartphone) and fixed communication devices (e.g., a business phone in an office building). Conventional communication path and Internet Protocol (IP) packet flow may be forced to incur multiple interactions of transcoding between network devices during call setup. This can lead to a decrease in voice and/or audio quality for users during a call session. Additionally, conventional network operating environments can introduce complexity to a control plane and a user plane, such as forced conversion from IP version 6 (IPv6) to IP version 4 (IPv4) and/or forced conversion from a Session Initiation Protocol (SIP) scheme to an Integrated Serves Digital Network User Part (ISUP) scheme. This can decrease voice quality, increase packet latency and consume processor resources, which in turn decreases network availability, hardware capacity, and adds to runtime complexity through additional software module utilization.

The following detailed description is directed to providing embodiments to facilitate high-definition voice quality for call sessions between various mobile and wireline networks. For example, concepts and technologies provided herein provide a high definition voice fixed mobile convergence (HD-V FMC) network architecture that allows for a call request to alert multiple fixed and/or mobile communication devices using a single called telephone number, while also providing vocoder bypass between the calling device and multiple call receiving devices. The HD-V FMC network architecture can include Voice over Long Term Evolution (VoLTE) network attributes, Business Voice over Internet Protocol (BVoIP) network attributes, IP Multimedia Subsystem (IMS) network Attributes, and Fixed Mobile Convergence (FMC) network attributes. The VoLTE network attributes can include Long Term Evolution (LTE) coverage and authentication, IP Multimedia Subsystem (IMS) registration, an IMS Packet Data Network (PDN) connection, an active mode File Transfer Protocol, End-to-End (E2E) Session Initiation Protocol (SIP) Signaling, Quality of Service (QoS) message exchange, a QoS Class Indicator (QCI) bearer channel (e.g., QCI-1 bearer channel), and QoS maintenance signaling. The BVoIP network attributes can include Autonomous Virtual Private Network, a Management Information System (MIS), a Branch Office Extension (BOE), and a Network Gateway Border Element (NGBE). The BOE can be implemented on a receiving network and configured so as to allow voice packets to be delivered on a call path to an IP Border Element (IPBE) without transitioning through a network hub site on a VoIP network. The IMS network attributes can include IMS registration and electronic telephone number mapping (ENUM) routing within an IMS core. The FMC network attributes can include the active mode File Transfer Protocol, the E2E SIP signaling, a Differentiated Services Code Point exchange (DSCP Xchange), an account link service (carrier link), and reporting of QoS metrics and Class of Service (CoS) metrics.

The HD-V FMC network architecture can allow for multiple subscriber personas on a single communication device (e.g., a mobile communication device) while using only one SIM card. The HD-V FMC network architecture can associate multiple call receiving devices with a single called telephone number, and provide separate containers for call receiving devices while providing a network presence map so as to alert one or more active call receiving devices of an incoming call request that is placed using a single called telephone number. The HD-V FMC network architecture can be configured so as to bypass transcoding iterations, thereby decreasing call session latency and high-definition voice quality through a decrease in signal to noise ratio when compared to voice quality from forced transcoding through mobile and wireline network traversal. These and other aspects of the concepts and technologies disclosed herein will be illustrated and described in more detail below.

While some of the subject matter described herein may occasionally be presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types in response to execution on a processor. Moreover, those skilled in the art will appreciate that the subject matter described herein may be practiced with other computer system configurations, including hand-held devices, multiprocessor systems, microprocessor based or programmable consumer electronics, distributed computing systems, minicomputers, mainframe computers, switches, network servers, network edge devices, and other particularized, non-generic computing machines.

Referring now to FIG. 1, aspects of a system 100 for providing HD-V FMC on mobile and/or wireline networks will be described, according to an illustrative embodiment. The system 100 shown in FIG. 1 includes an originating network 102, a calling party 134, a calling device (CD) 135, a receiving network 148, a called party 184, and a plurality of call receiving devices (CRDs) 170, 176, and 180. The calling party 134 can include a subscriber to a wireless communication service for the CD 135 to communicatively couple with the originating network 102. The calling party 134 can be associated with the CD 135. Examples of the CD 135 can include, but should not be limited to, a mobile communication device, a user equipment, a computer system, an IP-enabled telephone device, a laptop, a tablet device, a wearable device, any other type of computing device capable of initiating and/or receiving voice communications, or combinations thereof. The called party 184 can include a subscriber to a HD-V FMC service 127 that can provide a network presence of CRDs associated with the called party 184, such as the CRDs 170, 176, and 180, and alert the plurality of CRDs 170, 176, and 180 of a call request so as to engage in a call session using at least one of the plurality of CRDs 170, 176, and 180. The plurality of CRDs 170, 176, and 180 can include, but should not be limited to, a mobile communication device, a user equipment, a computer system, an IP-enabled telephone device, a laptop, a tablet device, a wearable device, any other type of computing device capable of initiating and/or receiving voice communications, or combinations thereof. For example, as shown in FIG. 1, the plurality of CRDs 170, 176, and 180 are illustrated as three CRDs, specifically a CRD A 170, a CRD B 176, and a CRD C 180, however this may not always be the case. It is understood that zero, one, or more than one CRDs may be active and/or included within the system 100 according to various embodiments. Thus, the example shown in FIG. 1 is for illustration purposes only, and therefore should not be construed as limiting the scope of the disclosure in any way.

The CD 135 can communicatively couple with the originating network 102 based on a registration with the originating network 102 via the use of an identification module, such as a Subscriber Identification Module (SIM) 136. In some embodiments, the SIM 136 can include a Universal Integrated Circuit Card, a physical SIM card, a virtual SIM card, or a combination thereof. The SIM 136 can include a processor and a memory that stores identifiers associated with the calling party 134, the CD 135, and other information that can be used by the originating network 102 to identify a profile and/or communication subscription. For example, in some embodiments, the SIM 136 can include an International Mobile Subscriber Identity (IMSI) number 137 that is assigned to the SIM 136 which is in use on the CD 135. The calling party 134 can use the CD 135 to input a called telephone number 138 that the CD 135 can use to generate a call request 144 to engage in a call session 146 with a called party, such as the called party 184, via at least one of a plurality of devices associated with the called party 184, such as one or more of the CRD A 170, CRD B 176, and/or CRD C 180.

During a call session (e.g., the call session 146), the CD 135 and the CRD (e.g., any of the CRD A 170, the CRD B 176, and/or the CRD C 180) can facilitate voice communications through activation, implementation, and/or execution of a vocoder. As used herein, the term "vocoder" refers to a codec that, upon activation, implementation, and/or execution, can analyze and synthesize an audio input (e.g., from a human voice) for audio data compression, multiplexing, voice encryption, voice transformation, or other data transformation so as to facilitate a call session (e.g., the call session 146) between devices participating and/or could participate in a call session (e.g., the CD 135 and any of the CRD A 170, the CRD B 176, and/or the CRD C 180). Examples of a vocoder can include, but should not be limited to, a G.711 codec, a G.722 codec, an Adaptive Multi-Rate (AMR) codec and variants thereof (e.g., AMR Wideband, AMR Narrowband, AMR-WB+, and/or an Enhanced Voice Services codec), a Meridian Lossless Packing (MLP) codec, a Pulse-code modulation (PCM) codec, any other voice codec, or a combination thereof. For illustration purposes, vocoders associated with, and capable of being executed by, the CD 135 are referred to herein as a "calling vocoder," and vocoders associated with, and capable of being executed by, the CRD (e.g., any of the CRD A 170, the CRD B 176, and/or the CRD C 180) are referred to as a "called vocoder." It is understood that the terms "calling" and "called" before the term "vocoder" are used for clarification purposes only, and therefore should not limit the scope of a vocoder's operation in any way. As such, a "calling vocoder" and/or a "called vocoder" may be used by a communication device participating in a call session irrespective of whether the particular communication device is an initiator of the call session. It is also understood that each communication device can have separate and/or different vocoders from other communication devices participating in a call session. Therefore, the examples discussed herein are for illustration purposes only, and should not be construed as limiting in any way.

In some embodiments, the CD 135 can store a plurality of calling vocoders 142A-N (collectively referred to herein as calling vocoders 142). In some embodiments, the calling vocoders 142 can be identified in a calling vocoder list 140. In some embodiments, the calling vocoder list 140 can be stored in a memory of the CD 135 and/or the originating network 102. The calling vocoder list 140 can identify at least one, and/or all, calling vocoders 142 that are resident on the CD 135 and/or capable of being activated, implemented, and/or executed on the CD 135. When participating in a call session (e.g., the call session 146), the CD 135 can be instructed to activate and/or invoke execution of one of the calling vocoders 142, such as the calling vocoder 142A from among an N amount of calling vocoders 142N. Similarly, each of the CRDs 170, 176, 180 can utilize a respective called vocoder. For example, the CRD A 170 can store one or more called vocoder A (CV A) 172, the CRD B 176 can store one or more called vocoder B (CV B) 178, and the CRD C 180 can store one or more called vocoder C (CV C) 182. The called party 184 can be associated with each of the CRD A 170, the CRD B 176, and the CRD C 180, with each CRD having one or more called vocoder that is and/or can be implemented and executed for participation in the call session 146. Further discussion of aspects pertaining to vocoder selection will be discussed below.

In operation, the calling party 134 can use the CD 135 to initiate the call request 144. The call request 144 can include the called telephone number 138 that can conform to an E.164 numbering standard. In some embodiments, the call request 144 can include a request for an IP-based call to be setup in order to facilitate the call session 146. The call session 146 can be setup to occur between the CD 135 and at least one of the CRD A 170, the CRD B 176, and the CRD C 180 using the single called telephone number 138. The CD 135 can communicatively couple to the originating network 102 via an access point 104. In some embodiments, the access point 104 can include one or more of a base transceiver station, an enhanced node B, a wireless access point, a provider edge device, a router, a customer edge device, or other network access point configured to facilitate communications, such as communications between the CD 135 and the originating network 102. In some embodiments, the originating network 102 can include an Evolved Packet Core (EPC) network 106 and an Internet Protocol Multimedia Subsystem (IMS) network 132. In some embodiments, the access point 104 can reside at an edge of the originating network 102, such as within the EPC network 106.

In some embodiments, the call request 144 can initiate a call registration and/or call setup in order to configure the originating network 102 and/or the receiving network 148 for participation in the call session 146. The call request 144 can include a Session Initiation Protocol (SIP) message that, in some embodiments, corresponds with a command, such as "REGISTER" (hereinafter SIP REGISTER message). Thus, sending, forwarding, or other interactions involving the call request 144 will include passage of the SIP message and commands contained therein. The call request 144 can be generated by the CD 135 and be sent to the access point 104 of the originating network 102. After receiving the call request 144, the access point 104 can forward the call request 144 to a Proxy Gateway (P-GW) that can execute a Policy and Charging Enforcement Function (PCEF) 108 (hereinafter P-GW/PCEF 108). The P-GW/PCEF 108 can be implemented on a network server, a distributed computing system, a network node, or other non-generic particular computer system within the originating network 102. In some embodiments, the P-GW/PCEF 108 can communicatively couple with a Policy and Charging Rules Function (PCRF) 110 executing on a computer system of the originating network 102. In some embodiments, the PCRF 110 can serve as a mediator of network resources between the EPC network 106 and the IMS network 132 for establishing calls and allocating bandwidth or other network attributes to call paths for call sessions. In some embodiments, the PCRF 110 and the P-GW/PCEF 108 can communicatively couple with a computer system executing a Proxy Call Session Control Function (P-CSCF) 114 via a communication path 1. It is understood that the IMS network 132 and the EPC network 106 can be communicatively coupled using intermediary network node devices (e.g., switches and routers) and using more than one communication path. Therefore, the examples discussed are for illustration purposes and should not be construed as limiting the scope of the disclosure in any way.

The P-GW/PCEF 108 can forward the call request 144 along the communication path 1 to the computer system executing the P-CSCF 114 that can be used, in some embodiments, for an attachment process to the EPC network 106 (e.g., an LTE attach process). The P-CSCF 114 can query a Domain Name Server (DNS) 116 via the communication path 2 in order to determine a routing address to an Interrogating Call Session Control Function (I-CSCF) 118. In some embodiments, because multiple instances of an I-CSCF may exist within the originating network 102, the routing address of the I-CSCF 118 can identify the I-CSCF 118 which is assigned to service the location of the CD 135 within the originating network 102. The routing address may identify that a communication path 3 should be used to communicatively couple with the I-CSCF 118. Once the routing address to the I-CSCF 118 is determined, the P-CSCF 114 can use the routing address to forward the call request 144 to the I-CSCF 118 via the communication path 3.

The I-CSCF 118 can query a Home Subscriber Server (HSS) 120 that is assigned to service the CD 135 and/or the SIM 136 contained therein. The I-CSCF 118 can communicate with the HSS 120 via a communication path 4. In some embodiments, an identifier of the CD 135 (e.g., the IMSI 137) can be included in the call request 144. When the I-CSCF 118 queries the HSS 120, the I-CSCF 118 can provide the HSS 120 with the IMSI 137 or any other identifier corresponding to the CD 135. The HSS 120 can determine if the CD 135 is already assigned to a Serving Call Session Control Function (S-CSCF) 122 that facilitates routing to one of the plurality of CRDs (e.g., any of the CRD A 170, the CRD B 176, and the CRD C 180). If so, then the HSS 120 can respond to the I-CSCF 118 via the communication path 4 with a network address of the assigned S-CSCF (e.g., the S-CSCF 122). If an S-CSCF has not yet been assigned, the HSS 120 can identify a subscriber profile 121 corresponding to the CD 135 based on the IMSI 137 or other identifying information. The HSS 120 can communicate with the S-CSCF 122 via a communication path 5 so as to verify that the S-CSCF 122 services the network location of the CD 135 and should be assigned for use in setup of the call session 146. The HSS 120 can determine that the S-CSCF 122 should be assigned to service the CD 135 due to the network location of the CD 135 and due to call request 144 being destined for the receiving network 148. The HSS 120 can respond to the I-CSCF 118 with the network address of the S-CSCF 122, thereby indicating that the S-CSCF 122 has been selected for use in setup of the call session 146. The I-CSCF 118 can then forward (via a communication path 6) the call request 144 (along with any SIP message included therein) to the S-CSCF 122 that is based on the network address of the S-CSCF 122.

The S-CSCF 122 can be configured to determine a call path for the call session 146 to use between the originating network 102 and the receiving network 148. For example, the S-CSCF 122 can determine that at least a communication path 10 will be setup from the originating network 102 to the receiving network 148 and will serve as a portion of a call path for the call session 146. The S-CSCF 122 may perform further operations discussed herein to determine whether a communication path 11, a communication path 12, and/or a communication path 13 will serve as a portion of the entire call path for the call session 146. To allow for connection to the called party 184 via the call session 146, the S-CSCF 122 can proceed with setup to support the call session 146. In some embodiments, the S-CSCF 122 can query the HSS 120 via the communication path 5 to retrieve authentication parameters (e.g., credentials, keys, and/or tokens that, in some embodiments, can be presented to the NGBE 152 and/or the AS 166 to facilitate setup of the call session 146) that are within the subscriber profile 121 associated with the called party 184 and the called telephone number 138. The subscriber profile 121 can indicate that the called party 184 subscribes to the HD-V FMC service 127 that allows for tracking of the network presence of each CRD 170, 176, and 180 associated with the called party 184 and the called telephone number 138. The subscriber profile 121 and the call request 144 can be used by the S-CSCF 122 to register the CD 135 and/or the CRDs 170, 176, and 180 with a telephone application server (TAS) 124 and/or other application servers via a communication path 7. The S-CSCF 122 can also subscribe to event notifications on behalf of the CD 135 and/or CRDs associated with the called telephone number 138 (e.g., any of the CRD A 170, the CRD B 176, and the CRD C 180). In some embodiments, the S-CSCF 122 can use the subscriber profile 121 and/or the call request 144 (along with any SIP message and commands contained therein) to create a fixed mobile convergence (FMC) request 112 based on the called party subscribing to the HD-V FMC service 127 (as indicated in the subscriber profile 121). The FMC request 112 can be configured to alert an electronic number mapping system server 126 (hereinafter "ENUM server 126") that the call path of the call session 146 will extend (or otherwise be) from the originating network 102 to the receiving network 148. The ENUM server 126 can create a network presence map (NPM) 128 that identifies at least one of a plurality of CRDs corresponding to the called telephone number 138. The FMC request 112 can include the called telephone number 138 and/or an identification of the subscriber profile 121. The ENUM server 126 may store a plurality of network presence maps for subscribers to an HD-V FMC service. In response to receiving the FMC request 112, the ENUM server 126 can extract information contained therein (e.g., the called telephone number 138), determine that the NPM 128 corresponds with the called telephone number 138, and pull the NPM 128 from memory. The ENUM server 126 can use the NPM 128 to identify one or more Call Receiving Device Identifiers (CRD IDs) 130 associated with the CRDs (e.g., any of the CRD A 170, the CRD B 176, and the CRD C 180) that can participate in the call session 146.

The NPM 128 may associate the called telephone number 138 with the CRD IDs 130 corresponding to the CRD A 170, the CRD B 176, and the CRD C 180. The CRD IDs 130 can provide a device identifier for each respective CRD and an IP address of a network node and/or a network edge device corresponding to each CRD. In some embodiments, the device identifier for one of the CRDs can include an IMSI, a Mobile Equipment Identifier (MEID), a telephone number corresponding to the particular CRD, or other identifier indicating the accessibility of a CRD via the receiving network 148. In some embodiments, the NPM 128 may provide the S-CSCF 122 with CRD IDs 130 for only CRDs on the receiving network 148 that are active and capable of engaging in the call session 146. Therefore, although only one called telephone number 138 may be provided in the call request 144, in some embodiments, the called party 184 may be alerted of the call request 144 on one or more CRDs associated with the called party 184 that are active and communicatively coupled to the receiving network 148 (e.g., via a visual, audible, and/or mechanical alarm being provided by one or more of the CRD A 170, the CRD B 176, and the CRD C 180 associated with the called party 184).

For example, the receiving network 148 can include a Voice over Internet Protocol (VoIP) network 150, a Public Switched Telephone Network (PSTN) 168, and an Internet Protocol based Multiprotocol Label Switching (IP/MPLS) network 174. In some embodiments, the VoIP network 150 may be communicatively coupled to the PSTN 168 and the IP/MPLS network 174. In some embodiments, the CRD A 170 includes a fixed telephone communicatively coupled to the PSTN 168 via the communication path 11, the CRD B 176 includes a smartphone wirelessly coupled to the IP/MPLS network 174 via an access point 185, as illustrated by the communication path 12, and the CRD C 180 includes a tablet (which the called party 184 may use for business purposes) that communicatively couples to the IP/MPLS network 174 via the communication path 13.

In an embodiment, if each of the CRD A 170, the CRD B 176, and the CRD C 180 are powered on and active with the receiving network 148 along their respective communication paths, then the ENUM server 126 can configure the NPM 128 to indicate that each of the CRD A 170, the CRD B 176, and the CRD C 180 are active and present within the receiving network 148 and able to participate in the call session 146. Thus, the NPM 128 can provide a network presence of each of the CRDs associated with the called telephone number 138 (e.g., the CRD A 170, the CRD B 176, and the CRD C 180). As used herein, the phrase "network presence" refers to an indication within the NPM 128 as to whether one of the CRDs associated with the called telephone number 138 is active (i.e., powered on and communicatively coupled to the receiving network 148), capable, and/or available to engage and/or participate in the call session 146 at a time that the FMC request 112 is received by the ENUM server 126 (referred to as an "active network presence"), or is inactive (i.e., not communicatively coupled to the receiving network 148) and not currently capable and/or available to engage and/or participate in the call session 146 at the time in which the FMC request 112 is received by the ENUM server 126 (referred to as an "inactive network presence"). The NPM 128 can indicate the network presence for each CRD associated with the NPM 128 (e.g., the CRD A 170, the CRD B 176, and the CRD C 180), such as by reference to each CRD within the NPM 128 having an active network presence or an inactive network presence. In this embodiment, the ENUM server 126 can instruct the receiving network 148 to notify each of the CRDs with an active network presence (e.g., any of the CRD A 170, the CRD B 176, and the CRD C 180) that the call request 144 is requesting participation of the respective CRD in the call session 146, thereby causing each of the CRDs 170, 176, 180 to ring, vibrate, notify, or otherwise provide an indication of the incoming call request 144 from the CD 135. In some embodiments, the ENUM server 126 can track each CRD associated with the called telephone number 138 and update the NPM 128 when the network presence of the CRD changes and/or stays the same.

In an embodiment, for example, the CRD C 180 (e.g., a tablet used for work and capable of receiving IP-based calls) may not be communicatively coupled to the receiving network 148 (e.g., due to the CRD C 180 being turned off because the called party 184 is off work or the CRD C 180 being powered on but not communicating with the receiving network 148, such as because of a lack of current network coverage and/or radio transceivers of the CRD C 180 being deactivated). However, the called party 184 may be at home where the CRD B 176 (e.g., their personal smartphone) and the CRD A 170 (e.g., their home phone) are turned on and have an active network presence (i.e., are communicatively coupled with the receiving network 148 and able to participate in a call session). In this alternate embodiment, the ENUM server 126 can instruct the receiving network 148 to notify the CRD A 170 and the CRD B 176 that the call request 144 is requesting participation in the call session 146, thereby causing the CRD A 170 and the CRD B (but not the CRD C 180) to ring, vibrate, notify, or otherwise provide an indication of the incoming call request 144 from the CD 135. It is understood that the examples discussed in the various embodiments are for illustration purposes only, and therefore should not be construed as limiting in any way.

The ENUM server 126 can provide the S-CSCF 122 with the NPM 128 that includes the CRD IDs 130 for the CRDs that have an active network presence, and thus can participate in the call session 146. Thus, any CRD with an active network presence in the receiving network 148 indicated in the NPM 128 can participate in the call session 146 if the called party 184 chooses to accept the call request 144 via one of the CRDs. The S-CSCF 122 can identify and/or obtain a network address within the receiving network 148 for each CRD ID 130 corresponding to an active CRD in the NPM 128 that was sent from the ENUM server 126. The network address can be included in a route control message that is sent to an application server (AS) 166 so as to identify a network node within the receiving network 148 to alert the CRDs of the call request 144. For example, the network address can include an IP address of a SIP centralized policy and routing server (SIP PSX) 162 (e.g., a SIP PSX IP 163), an IP address of a Network Gateway Border Element (NGBE) 152, or any other network node that can facilitate communication service to a CRD during the calling session 146. In some embodiments, the S-CSCF 122 can send an instance of the NPM 128, including the CRD IDs 130 corresponding to the one or more CRDs 170, 176, 180, to the AS 166 of the receiving network 148. In some embodiments, the VoIP network 150 can include the AS 166, the SIP PSX 162, the NGBE 152, and an IP Border Element (IPBE) 164.

In some embodiments, the S-CSCF 122 can communicate with the AS 166 via a DIAMETER protocol (e.g., according to the Internet Engineering Task Force Request for Comment number 4740) and/or an enhanced protocol (that may obsolete the DIAMETER protocol). In some embodiments, the enhanced protocol can include aspects of the DIAMETER protocol, along with a computer executable command for the FMC request 112 so as to alert the ENUM server 126 and/or other network nodes that call paths from the originating network 102 to the receiving network 148 are to be set up (e.g., a call path that spans from use of VoLTE to use of BVoIP). In some embodiments, the enhanced protocol also can include an Enhanced Capability Exchange Request (ECER) that can facilitate negotiation and selection of vocoders between a calling device and at least two or more call receiving devices (e.g., the CD 135 and two or more CRDs, such as the CRD A 170, the CRD B 176, and the CRD C 180) at one time during setup of the call session 146. This is in contrast to conventional systems that may allow for negotiation and selection of vocoders between only two communication devices at one time. In some embodiments, the enhanced protocol also can include a SIP Application Capability Attribute Value Pair Enhanced (CAVPE) that facilitates identification of all vocoders that are supported on each of the CD 135 and the plurality of CRDs (e.g., the CRD A 170, the CRD B 176, and the CRD C 180).

In some embodiments, the ENUM server 126, the S-CSCF 122, or another computer system of the originating network 102 can prepare the calling vocoder list 140 associated with the CD 135. In other embodiments, identifiers of the calling vocoders 142 can be sent from the CD 135, and the P-GW/PCEF 108 can prepare the calling vocoder list 140, which in turn can be provided to the NGBE 152. The calling vocoder list 140 can identify at least one calling vocoder 142 that is supported by the CD 135. In some embodiments, the AS 166 can receive the calling vocoder list 140. In some embodiments, the calling vocoder list 140 can be included in an ECER/CAVPE message 113 sent from the S-CSCF 122 via the communication path 9 to the AS 166. In other embodiments, the NGBE 152 may receive the calling vocoder list 140 via the communication path 10 upon request from the P-GW/PCEF 108. The AS 166 can use the NPM 128 to command the NGBE 152 to engage in negotiating vocoder selection between the CD 135 and each of the plurality of CRDs corresponding to the CRD IDs 130 received from the S-CSCF 122 and indicated as having an active network presence within the NPM 128. The negotiation of vocoder selection for all CRDs 170, 176, and/or 180 can occur prior to one of the CRDs 170, 176, and/or 180 participating in the call session 146.

Each of the CRDs 170, 176, and 180 can have one or more vocoders that can be used to support voice communications during the call session 146. As such, vocoders resident on a CRD can be referred to as a "called vocoder." For example, the CRD A 170 can include the called vocoders A 172, the CRD B 176 can include the called vocoders B 178, and the CRD C 180 can include the called vocoders C 182. In some embodiments, the NGBE 152 can identify the called vocoders that are supported by each CRD so as to compile a called vocoder list 160. For example, the called vocoder list 160 can include identifications for each of the called vocoders A 172, the called vocoders B 178, and the called vocoders C 182. As used herein, the phrase "negotiation of vocoder selection" (and variants thereof) refers to interactions between the network devices (e.g., the P-GW/PCEF 108 and the NGBE 152) that facilitate selection of an active calling vocoder for the CD 135 to use during the call session 146 and selection of an active called vocoder for each of the CRDs 170, 176, and 180 to use during the call session 146, which can occur prior to one of the CRDs 170, 176, and 180 participating in the call session 146. For example, in some embodiments, negotiation of vocoder selection between the CD 135 and each of the CRDs 170, 176, and 180, can include the AS 166 providing the NPM 128 to the NGBE 152 and the calling vocoder list 140 being provided to the NGBE 152 from the AS 166 and/or the P-GW/PCEF 108. The NGBE 152 can create and/or obtain the called vocoder list 160 that identifies the called vocoders 172, 178, and 182 that are supported by the plurality of CRDs 170, 176, and 180, respectively. The called vocoder list 160 can be created and/or obtained by the NGBE 152 based on the CRDs identified as having an active network presence within the NPM 128.

In some embodiments, the NGBE 152 can provide, to the P-GW/PCEF 108, the called vocoder list 160 along with identification of communication paths that can be implemented to facilitate the call session 146 (e.g., the communication path 11 for CRD A 170, the communication path 12 for CRD B 176, and/or the communication path 13 for the CRD C 180). Using the calling vocoder list 140 and the called vocoder list 160, in some embodiments, the P-GW/PCEF 108 and/or the NGBE 152 can assign, for the call session 146, one of the calling vocoders 142 and one of the called vocoders of each CRD (e.g., one of the called vocoders A 172, one of the called vocoders B 178, and/or one of the called vocoders C 182) that is active and capable of participation in the call session 146 based on the called vocoder list 160 and/or the calling vocoder list 140. In some embodiments, the NGBE 152 and/or the P-GW/PCEF 108 can create one or more of an active vocoder pair that identifies which calling vocoder should be used by the CD 135 and which called vocoder should be used by a particular CRD if the call session 146 were to occur with that particular CRD. For example, if the CRD A 170, the CRD B 176, and the CRD C 180 all have an active network presence indicated in the NPM 128 (i.e., powered on and communicatively coupled to the receiving network 102), then three active vocoder pairs (AVP) can be created by the NGBE 152 and/or the P-GW/PCEF 108. In this example, the active vocoder pairs can include an AVP A 186 that involves the CD 135 and the CRD A 170, an AVP B 188 that involves the CD 135 and the CRD B 176, and an AVP C 190 that involves the CD 135 and the CRD C 180. The AVP A 186 can include one of the calling vocoders 142 (e.g., the calling vocoder 142A) and one of the called vocoders A 172 should the call session 146 occur between the CD 135 and the CRD A 170 along the communication path 11. Similarly, the AVP B 188 can include one of the calling vocoders 142 (e.g., a calling vocoder 142B) and one of the called vocoders B 178 should the call session 146 occur between the CD 135 and the CRD B 176 along the communication path 12. Additionally, the AVP C 190 can include one of the calling vocoders 142 (e.g., the calling vocoder 142N) and one of the called vocoders C 182 should the call session 146 occur between the CD 135 and the CRD C 180 along the communication path 13.

It is understood that the calling vocoder and called vocoder selected in each AVP may not necessarily be the same; however, in some embodiments the calling vocoder and the called vocoder can be the same. In some embodiments, the calling vocoder and the called vocoder are selected for inclusion within each AVP based on an amount of transcoding iterations (ATI) that would occur should the call session 146 be routed along a particular call path between the CD 135 and each CRD with an active network presence (e.g., any of the CRD A 170, the CRD B 176, and/or the CRD C 180). The phrase "amount of transcoding iterations" refers to how often a transcoding process occurs in order to enable voice communications to occur between two devices in a call session. It is understood that a transcoding process can occur when the calling vocoder is not the same as a called vocoder and can entail any transformations that occur in converting voice data from the format of the calling vocoder to the format of the called vocoder. In some embodiments, the AVP for each set of communication devices can correspond with a vocoder selection that provides the least amount of transcoding iterations. In some embodiments, the least amount of transcoding iterations can reduce latency in setup of the call session 146, and may improve audio quality through decreased transcoding iterations. In some embodiments, an ATI can also be referred to as a number of transcoding iterations and/or layers of transcoding iterations.

In some embodiments, the NGBE 152 and/or the P-GW/PCEF 108 can determine the least amount of transcoding iterations that can be possible for each AVP, and create an ATI value indicating the least ATI for each AVP pair, such as an ATI A 154 for the AVP A 186, an ATI B 156 for the AVP B 188, and an ATI C 158 for the AVP C 190. For example, an ATI A 154 can identify the least amount of transcoding iterations that would occur if a call session included the CD 135 and the CRD A 170 using a call path that includes the communication path 11. In this example, the CD 135 may be a smartphone that has two calling vocoders 142A and 142B, where the calling vocoder 142A may correspond with an AMR codec and the calling vocoder 142B may correspond with an EVP codec. In this example, the CRD A 170 may have one called vocoder, the called vocoder A 172 that can be a PCM codec. If the CRD A 170 happened to support the same vocoder found on the CD 135, then the ATI A 154 would yield a "one" value because the called vocoder and the calling vocoder match and therefore only one transcoding process would occur. However, in this example, the called vocoder 172 does not match any of the calling vocoders 142A, 142B. Thus, the NGBE 152 and/or the P-GW/PCEF 108 can determine that if the calling vocoder 142A is used in the call session 146, then two transcoding iterations may occur, whereas if the calling vocoder 142B is used, then three transcoding iterations may occur. Because the least amount of transcoding iterations is two and corresponds with the calling vocoder 142A, the NGBE 152 and/or the P-GW/PCEF 108 can assign the ATI A 154 with a value of two and can designate that the AVP A 186 should include the calling vocoder 142A as the assigned calling vocoder and the called vocoder A 172 as the assigned called vocoder. It is understood that the example discussed is for illustration purposes only and should not be construed as limiting in any way.

The operations discussed above for determining a least amount of iterations may be substantially similar when considering the ATI B 156 corresponding to the AVP B 188 and the ATI C 158 corresponding to the AVP C 190. For example, in an embodiment, if the CD 135 continues to have two calling vocoders 142A, 142B, the NGBE 152 and/or the P-GW/PCEF 108 may determine that CRD B 176 includes one called vocoder B 178 that is the same as at least one of the calling vocoders 142A, 142B. Because the called vocoder B 178 is the same as one of the calling vocoder 142A, 142B, then the NGBE 152 and/or P-GW/PCEF 108 can designate the ATI B 156 as having a value of zero and can designate that the AVP B 188 should include the calling vocoder (i.e., one of the calling vocoders 142A or 142B) that matches the called vocoder (i.e., the called vocoder B 178) as being the active calling vocoder and active called vocoder, respectively. In an alternate embodiment, the CD and the CRD may share support of multiple vocoders (e.g., multiple calling vocoders may match multiple called vocoders thereby yielding the same amount of transcoder iterations for each pair of calling vocoders and called vocoders). In this alternate embodiment, the NGBE 152 and/or the P-GW/PCEF 108 can select the active calling vocoder and the active called vocoder for the call session 146 to be whichever shared vocoder has the highest bitrate, or other call quality attribute, so as to provide a greater voice quality during the call session 146. Similarly, the NGBE 152 and/or the P-GW/PCEF 108 can provide substantially similar operations for the ATI C 158 and the AVP C 190 so as to determine which calling vocoder and called vocoder should be used if the call session were to occur using a call path that included the communication path 13. Therefore, the negotiation of vocoder selection can include determination of the assigned vocoder pair that has a corresponding amount of transcoding iterations. It is understood that the examples discussed above are for illustration purposes only, and therefore should not be construed as limiting in any way.

In some embodiments, once the vocoder selection has been negotiated for all communication devices that could participate in the call session 146, each CRD that is available to participate in the call session 146 may be alerted of the call request 144, such as via audible ringing, mechanical vibration, visual notifications, or any other mechanism for informing the called party 184 of an incoming call. In some embodiments, the called party 184 may answer the call request 144 using only one CRD, such as picking up the receiver of the CRD A 170 or pressing "accept" on the CRD B 176 that is configured as a smartphone, according to an embodiment. The NGBE 152 and/or P-GW/PCEF 108 can listen for which CRD has accepted the call request 144 and thus will participate in the call session 146. For example, as shown in FIG. 1, the called party 184 may accept the call request 144 via the CRD B 176. In response to identifying which CRD will participate in the call session 146 (e.g., the call session 146 occurring between the CD 135 and the CRD B 176), the NGBE 152 and/or the P-GW/PCEF 108 can instruct the CD 135 to activate the calling vocoder indicated in the AVP B 188 and instruct the CRD B 176 to activate the called vocoder indicated in the AVP B 188 for use during the call session 146.

In some embodiments, the AS 166 can provide the S-CSCF 122 and the ENUM server 126 with a Network Presence Update (NPU) message 129 that can identify any changes to the network presence of CRDs associated with the NPM 128 for the called telephone number 138. For example, the CRD C 180 may have previously been turned off and thus registered as having an inactive network presence on the NPM 128. However, the AS 166 can detect when the CRD C 180 is turned back on or otherwise communicatively couples with the receiving network 148, and in response, send the NPU message 129 to update the NPM 128 with a current network presence of the CRD C 180 and any other CRD associated with the NPM 128. Thus, the ENUM server 126 can track whether each of the CRD A 170, the CRD B 176, and the CRD C 180 (or any other CRD of the receiving network 148) is active and capable of participating in the call session 146 based on one or more NPU message 129 from the AS 166.

In some embodiments, while the call session 146 is occurring (e.g., between the CD 135 and the CRD B 176), the called party 184 may desire to switch devices so as to carry on the call session 146 using the CRD C 180 instead of, or in addition to, the communication device which was previously in use (e.g., the CRD B 176). The NGBE 152 and/or the P-GW/PCEF 108 can determine that a new call receiving device is being requested for use during the call session 146 (e.g., the CRD B 176 sending a request to switch to the CRD C 180). In some embodiments, the NGBE 152 and/or the P-GW/PCEF 108 can renegotiate vocoder selection for the CD 135 and the new call receiving device (e.g., the CRD C 180) based on the respective calling vocoder in use during the call session 146. For example, the call session 146 between the CD 135 and the CRD B 176 may be implementing the active calling vocoder and the active called vocoder indicated in the AVP B 188. When the NGBE 152 and/or the P-GW/PCEF 108 determines that the call session 146 should also, or instead, include the CD 135 and the CRD C 180, then the NGBE 152 and/or the P-GW/PCEF 108 can pull the AVP C 190 from a memory and activate the called vocoder and the calling vocoder designated in the AVP C 190 for the CD 135 and the CRD C 180, respectively. In some embodiments, the renegotiation of vocoder selection may occur via the use of the ECER/CAVPE message 113 to communicate the AVP C 190 between the receiving network 148 and the originating network 102. In some embodiments, the calling party 134 and/or the called party 184 may experience a defined pause in audio from the respective CD 135 and the CRD B 176 while the CRD C 180 is included in the call session 146. In some embodiments, the ENUM server 126 can prohibit switching from one CRD to another while the call session 146 occurs so as to avoid audio disruptions.

It is understood that any of the P-GW/PCEF 108, PCRF 110, the P-CSCF 114, the DNS 116, the I-CSCF 118, the S-CSCF 122, the ENUM server 126, the HSS 120, and the TAS 124 can be co-located and/or distributed throughout the IMS network 132 and collectively can be referred to as an IMS core that configures at least one processor of the originating network 102 via executable instructions performing the operations discussed herein. It is also understood that zero, one, or more than one instance of the originating network 102, the access point 104, the EPC network 106, the P-GW/PCEF 108, PCRF 110, the P-CSCF 114, the DNS 116, I-CSCF 118, the S-CSCF 122, the ENUM server 126, the HSS 120, and the TAS 124, the IMS network 132, the receiving network 148, the VoIP network 150, the NGBE 152, the SIP PSX 162, the IPBE 164, the AS 166, the PSTN 168, the CRD A 170, the IP/MPLS network 174, the CRD B 176, the access point 185, and/or the CRD C 180, can be included within the system 100. It is understood that the examples are for illustration purposes only and should not be construed as limiting in any way.

Figure 2:
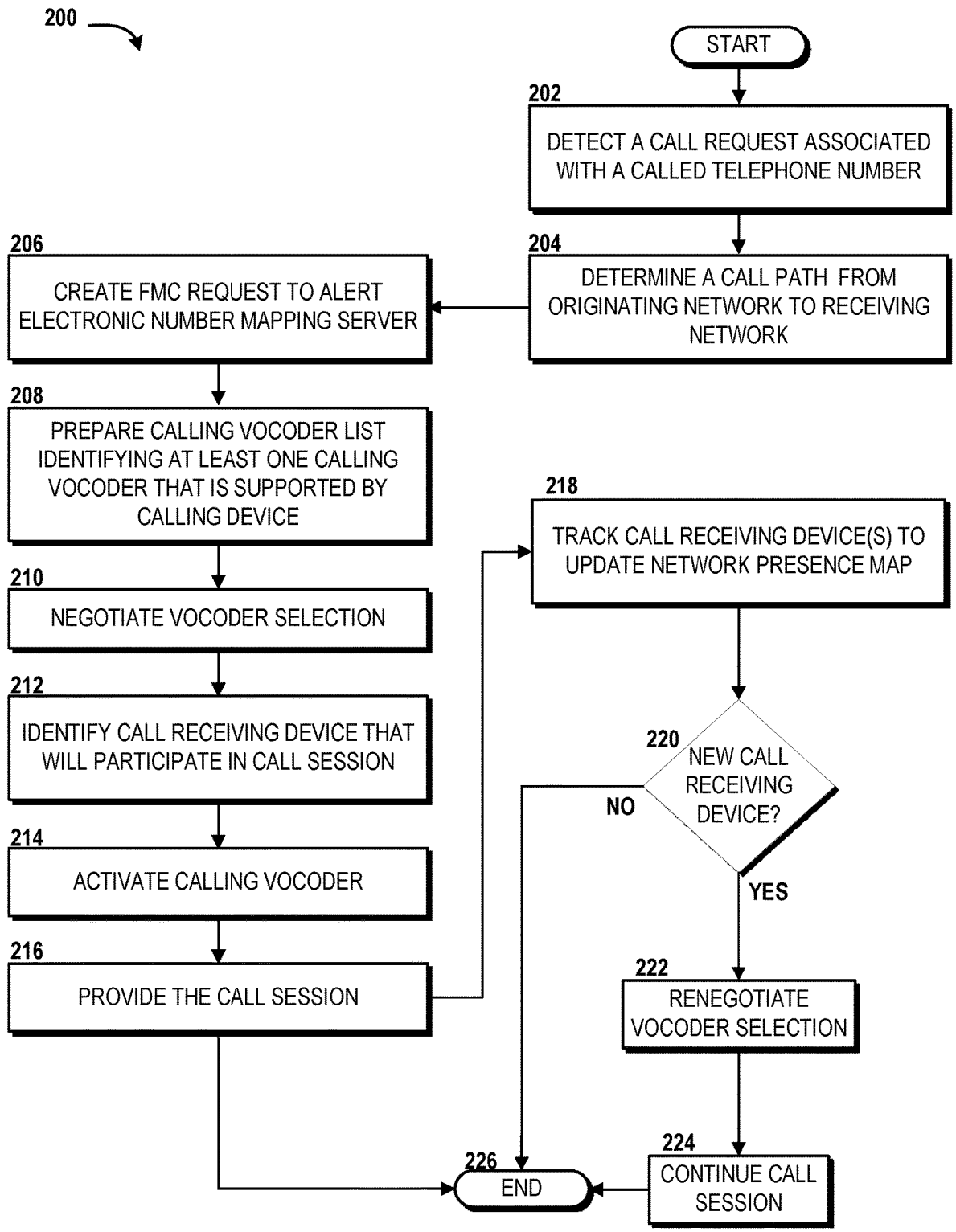
FIG. 2 is a flow diagram illustrating a method for providing high-definition voice for fixed mobile convergence on mobile and wireline networks, according to an embodiment of the present disclosure.

Turning now to FIG. 2, aspects of a method 200 for providing high-definition voice for Fixed Mobile Convergence on mobile and wireline networks, will be described, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing one or more processors of a computing system or device discussed herein, such as but not limited to a computer system implementing one or more of the P-GW/PCEF 108, the PCRF 110, the DNS 116, the P-CSCF 114, the I-CSCF 118, the S-CSCF 122, the HSS 120, the ENUM server 126, and/or the TAS 124, to perform one or more operations and/or causing the processor to direct other components of a computing system or device to perform one or more of the operations.

For purposes of illustrating and describing some of the concepts of the present disclosure, operations of the method 200 are described as being performed, at least in part, by a computer system of the originating network 102 (e.g., one or more of the P-GW/PCEF 108, the PCRF 110, the DNS 116, the P-CSCF 114, the I-CSCF 118, the S-CSCF 122, the HSS 120, the ENUM server 126, the TAS 124, etc.) and/or a computer system of the receiving network 148 (e.g., the NGBE 152, the SIP PSX 162, the AS 166, the IPBE 164, etc.) one or more of via execution, by one or more processors, of one or more software modules that configures one or more processors. It should be understood that additional and/or alternative devices and/or network devices can provide the functionality described herein via execution of one or more modules, applications, and/or other software. Thus, the illustrated embodiments are illustrative, and should not be viewed as being limiting in any way.

The method 200 will be described with reference to FIG. 1. The method 200 begins and proceeds to operation 202, where the P-GW/PCEF 108 of the receiving network 102 can detect the call request 144 that is associated with the called telephone number 138, where the call request 144 can include a request to setup a call session, such as the call session 146. The call request 144 can be initiated from the CD 135, which can be associated with the originating network 102 and/or another network. In some embodiments, the originating network 102 can include an IMS network, such as the IMS network 132, and/or an EPC network, such as the EPC network 106, that supports wireless communication of the CD 135.

From operation 202, the method 200 proceeds to operation 204, where the S-CSCF 122, or other computer system of the originating network 102, can determine a call path for the call session 146 from the originating network 102 to a receiving network, such as the receiving network 148. In some embodiments, the receiving network 148 can include at least one of the VoIP network 150, the PSTN 168, and an IP/MPLS network 174. For example, in some embodiments, the S-CSCF 122 can determine that a call path for the call session 146 can include the communication path 10 from the EPC network 106 of the originating network 102 to the VoIP network 150 of the receiving network 148. In some embodiments, the S-CSCF 122 can query the HSS 120 to determine that the called telephone number 138 is associated with the subscriber profile 121, which can identify multiple CRDs associated with the called telephone number 138. In turn, the S-CSCF 122 can determine that a call path for the call session 146 could include multiple communication paths to the separate CRDs indicated in the subscriber profile 121.

From operation 204, the method 200 can proceed to operation 206 where the S-CSCF 122 can create the FMC request 112 to alert the ENUM server 126 that the call path for the call session 146 will be from the originating network 102 to the receiving network 148. In some embodiments, the FMC request 112 can indicate that the call path for the call session 146 will be to specific networks within the receiving network 148, such as the VoIP network 150, the PSTN 168, and/or the IP/MPLS network 174. The ENUM server 126 can generate the NPM 128 that identifies the CRD A 170, the CRD B 176, and the CRD C 180 as a plurality of CRDs associated with the called telephone number 138. The NPM 128 can indicate which of the CRDs 170, 176, and/or 180 have an active network presence, and thus are available to participate in the call session 146 via the receiving network 148. In some embodiments, if the NPM 128 has not yet been created, then the ENUM server 126 can use the FMC request 112 as a trigger to create the NPM 128, update the network presence of CRD IDs 130 corresponding to the called telephone number 138, and receive (from the AS 166) indications of whether the CRDs 170, 176, and 180 have an active network presence or inactive network presence. The ENUM server 126 can provide the NPM 128 that identifies the CRDs with an active network presence (e.g., any of the CRD A 170, the CRD B 176, and the CRD C 180) to the S-CSCF 122.

From operation 206, the method 200 can proceed to operation 208 where the P-GW/PCEF 108 can prepare the calling vocoder list 140 that identifies at least one calling vocoder that is supported by the CD 135 (e.g., the calling vocoders 142). From operation 208, the method 200 can proceed to operation 210 where the P-GW/PCEF 108 and/or the NGBE 152 can negotiate vocoder selection between the CD 135 and each of the plurality of CRDs that are available to participate in the call session 146, such as the CRDs 170, 176, and/or 180 indicated in the NPM 128 associated with the called telephone number 138. In some embodiments, the negotiation of vocoder selection can occur prior to one of the plurality of CRDs participating in the call session 146.

In some embodiments, the negotiation of vocoder selection between the CD 135 and each of the plurality of CRDs associated with the called telephone number 138 can include the NPM 128 generated by the ENUM server 126 being provided to the S-CSCF 122, which in turn can send the NPM 128 to the AS 166. In some embodiments, the S-CSCF 122 also can provide the calling vocoder list 140 to the AS 166, which can forward the NPM 128 and/or the calling vocoder list 140 to the NGBE 152. In some embodiments, the S-CSCF 122 can provide the AS 166 with the NPM 128, while the P-GW/PCEF 108 provides the calling vocoder list 140 to the NGBE 152. In some embodiments, the negotiation of vocoder selection also can include the P-GW/PCEF 108 obtaining the called vocoder list 160 from the NGBE 152. The called vocoder list 160 can identify called vocoders that are supported by the plurality of CRDs indicated in the NPM 128 as having an active network presence and thus available to participate in the call session 146. In some embodiments, the negotiation of vocoder selection also can include the P-GW/PCEF 108 and/or the NGBE 152 assigning a calling vocoder from the calling vocoder list 140 to each CRD that can participate in the call session 146. In some embodiments, the assignment of the calling vocoder can be based on the called vocoder list 160. For example, in some embodiments, the respective calling vocoder being assigned for each CRD indicated in the NPM 128 as having an active network presence and available to participate in the call session 146 can be based on an amount of transcoding iterations (ATI) that would occur along the call path between the originating network 102 and the receiving network 148. The ATI can be determined by the P-GW/PCEF 108 and/or the NGBE 152 by using the vocoders available within the calling vocoder list 140 and the called vocoders for each CRD as indicated in the called vocoder list 160. In some embodiments, the pair of vocoders that results in the least amount of iterations will be assigned. For example, the ATI A 154 can identify the least ATI for the vocoders within the AVP A 186. The P-GW/PCEF 108 and/or the NGBE 152 proceed with assigning vocoders for other CRDs, such as illustrated by the creation of ATI B 156 corresponding to AVP B 188 and the ATI C 158 corresponding to the AVP C 190, as discussed above with respect to FIG. 1.

From operation 210, the method 200 can proceed to operation 212 where the P-GW/PCEF 108 and/or the NGBE 152 can identify the CRD that will participate in the call session 146. For example, each of the CRD A 170, the CRD B 176, and the CRD C 180 may ring or otherwise notify the called party 184 of the call request 144, however the called party 184 may choose to answer the call request 144 via the CRD B 176. In response to the called party 184 selecting the CRD B 176 to answer the call request 144, the NGBE 152 can identify that the CRD B 176 will be used to participate in the call session 146, and this identification can be relayed to the P-GW/PCEF 108.

From operation 212, the method 200 can proceed to operation 214 where the P-GW/PCEF 108 can activate the respective calling vocoder for the CD 135 and the called vocoder for the CRD B 176. Activation of the calling vocoder and/or the called vocoder enables audio and voice data of the call session 146 to be transcoded via the particular transcoders selected for use by the CD 135 and the particular CRD (e.g., the CRD B 176 in this embodiment). The P-GW/PCEF 108 and/or the NGBE 152 can activate the vocoders by selecting the AVP corresponding to the communication devices involved in the call session 146 (e.g., CD 135 and the CRD B 176). Thus, in this example, the vocoders being activated are indicated in the AVP corresponding to the CD and the CRD that will participate in the call session (e.g., the calling vocoder and the called vocoder indicated in the AVP B 188 due to the CD 135 and the CRD B 176 participating in the call session 146 in the illustrated embodiment of FIG. 1). The calling vocoder and the called vocoder indicated in the AVP can be used during the call session 146 so as to facilitate communication between the CD 135 and the call receiving device that will participate in the call session 146 (e.g., the CRD B 176).

From operation 214, the method 200 can proceed to operation 216 where the originating network 102 and the receiving network 148 can provide or otherwise maintain the call session 146 between the CD 135 and the CRD (e.g., any of the CRDs 170, 176, or 180). In an embodiment, from operation 216, the method 200 can proceed to operation 226 where the method 200 can end.

In some embodiments, the method 200 can proceed from operation 216 to operation 218, where the ENUM server 126 can track at least one of the plurality of CRDs associated with the called telephone number 138 (e.g., the CRD A 170, the CRD B 176, and the CRD C 180) to update the NPM 128. In some embodiments, the ENUM server 126 can receive the NPU message 129 from the AS 166 via the S-CSCF 122 being communicatively coupled to the AS 166 via the communication path 9. The NPU message 129 can provide an updated network presence of at least one of the CRDs identified in the NPM 128. For example, the CRD C 180 may have been turned off when the call session 146 was being set up between the CD 135 and the CRD B 176. However, during or after the call session 146, the CRD C 180 may be turned on and commutatively coupled to the receiving network 148 via the IP/MPLS network 174 and the communication path 13. The AS 166 may detect this update via the IPBE 164 and/or the SIP PSX 162, and in turn, create the NPU message 129 that identifies the CRD C 180 as having an active network presence and an instruction to update the NPM 128.

From operation 218, the method 200 can proceed to operation 220 where the NGBE 152, the P-GW/PCEF 108, and/or the ENUM server 126 can determine whether a new call receiving device is being requested for use during the call session 146. For example, if the called party 184 desires to switch from their personal smartphone (e.g., the CRD B 176) to their tablet (e.g., the CRD C 180), then the ENUM server 126 can determine that the CRD C 180 is requesting to participate in the call session 146 that currently exists between the CD 135 and the CRD B 176. The ENUM server 126 can determine that a new call receiving device (e.g., the CRD C 180) is being requested for use during the call session 146. Thus, if a new call receiving device (e.g., a CRD not currently participating in the call session 146 but capable of participating in the call session 146) is detected and/or determined to be requesting participation in the call session 146, then the method 200 can proceed from operation 220 to operation 222.

At operation 222, the NGBE 152 and/or the P-GW/PCEF 108 can renegotiate vocoder selection for the CD 135 and the new CRD (e.g., the CRD C 180). In some embodiments, the vocoder selection can be renegotiated based on the respective calling vocoder in use during the call session 146, such as by determining whether the AVP C 190 includes the calling vocoder already in use by the CD 135. If so, then the NGBE 152 may send the CRD C 180 an instruction to activate the called vocoder already in use by the CD 135. However, if the AVP C 190 differs from the AVP B 188, then the NGBE 152 and/or the P-GW/PCEF 108 can instruct the CD 135 to activate the calling vocoder indicated in the AVP C 190 and can instruct the CRD C 180 to activate the called vocoder indicated in the AVP C 190.

From operation 222, the method proceeds to operation 224, where the receiving network 148 and the originating network 102 can continue the call session 146 along the communication path 13 so as to connect the CD 135 with the new call receiving device, which in this example can be CRD C 180. It is understood that more than one new call receiving device may be implemented in the call session 146, and therefore in some embodiments, the call session 146 can include the CD 135 and a plurality of CRDs (e.g., two or more of the CRD A 170, the CRD B 176, and the CRD C 180). From operation 224, the method proceeds to operation 226, where the method 200 can end.

Returning to operation 220, in an alternate embodiment, if a new CRD is not detected as requesting to join the call session 146, the method 200 can proceed from operation 220 to operation 226, where the method 200 can end. It should be understood that these examples are illustrative and therefore should not be construed as being limiting in any way.

Figure 3:
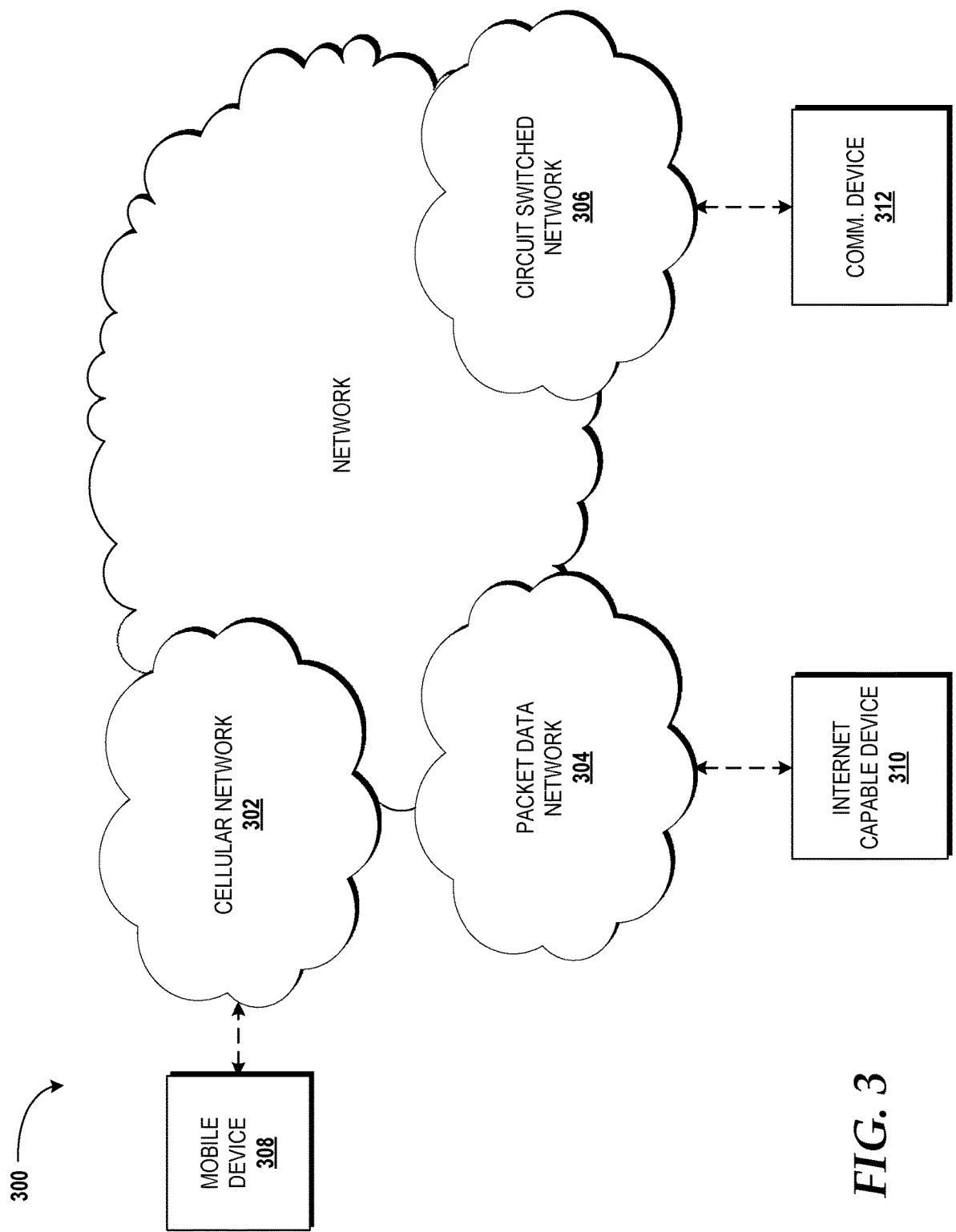
FIG. 3 is a block diagram illustrating an example network capable of implementing aspects of the embodiments presented herein.

Turning now to FIG. 3, details of a network 300 are illustrated, according to an illustrative embodiment. In some embodiments, the network 300 can include the originating network 102 and/or the receiving network 148. The network 300 includes a cellular network 302, a packet data network 304, for example, the Internet, and a circuit switched network 306, for example, a PSTN. The cellular network 302 includes various network components such as, but not limited to, base transceiver stations ("BTSs"), NBs or eNBs, base station controllers ("BSCs"), radio network controllers ("RNCs"), mobile switching centers ("MSCs"), MMEs, short message service centers ("SMSCs"), multimedia messaging service centers ("MMSCs"), home location registers ("HLRs"), HSSs, VLRs"), charging platforms, billing platforms, voicemail platforms, GPRS core network components, location service nodes, an IP Multimedia Subsystem ("IMS"), and the like. The cellular network 302 also includes radios and nodes for receiving and transmitting voice, data, and combinations thereof to and from radio transceivers, networks, the packet data network 304, and the circuit switched network 306.

A mobile communications device 308, such as, for example, a cellular telephone, a user equipment, a mobile terminal, a PDA, a laptop computer, a handheld computer, and combinations thereof, can be operatively connected to the cellular network 302. In some embodiments, the CD 135, the CRD A 170, the CRD B 176, and/or the CRD C 180 can be configured as the mobile communication device 308. The cellular network 302 can be configured as a 2G GSM network and can provide data communications via GPRS and/or EDGE. Additionally, or alternatively, the cellular network 302 can be configured as a 3G UMTS network and can provide data communications via the HSPA protocol family, for example, HSDPA, EUL (also referred to as HSUPA), and HSPA+. The cellular network 302 also is compatible with 4G mobile communications standards such as LTE, or the like, as well as evolved and future mobile standards, such as LTE-U.

The packet data network 304 includes various devices, for example, servers, computers, databases, and other devices in communication with one another, as is generally known. The packet data network 304 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 304 includes or is in communication with the Internet. In some embodiments, the EPC network 106, the IMS network 132, the VoIP network 150, and/or the IP/MPLS network 174 can be configured as a packet data network, such as the packet data network 304. The circuit switched network 306 includes various hardware and software for providing circuit switched communications. The circuit switched network 306 may include, or may be, what is often referred to as a POTS. In some embodiments, the PSTN 168 can be configured as a circuit switched network, such as the circuit switched network 306. The functionality of a circuit switched network 306 or other circuit-switched network are generally known and will not be described herein in detail.

The illustrated cellular network 302 is shown in communication with the packet data network 304 and a circuit switched network 306, though it should be appreciated that this is not necessarily the case. One or more Internet-capable devices 310, for example, a PC, a laptop, a portable device, or another suitable device, can communicate with one or more cellular networks 302, and devices connected thereto, through the packet data network 304. It also should be appreciated that the Internet-capable device 310 can communicate with the packet data network 304 through the circuit switched network 306, the cellular network 302, and/or via other networks (not illustrated).

As illustrated, a communications device 312, for example, a telephone, facsimile machine, modem, computer, or the like, can be in communication with the circuit switched network 306, and therethrough to the packet data network 304 and/or the cellular network 302. It should be appreciated that the communications device 312 can be an Internet-capable device, and can be substantially similar to the Internet-capable device 310. In the specification, the network of FIG. 3 is used to refer broadly to any combination of the networks 302, 304, 306 shown in FIG. 3. It should be appreciated that, in some embodiments, substantially all of the functionality described with reference to the receiving network 102 and/or the originating network 148 can be performed by the cellular network 302, the packet data network 304, and/or the circuit switched network 306, alone or in combination with other networks, network elements, and the like, according at least to aspects of the features and operations discussed herein.

Figure 4:
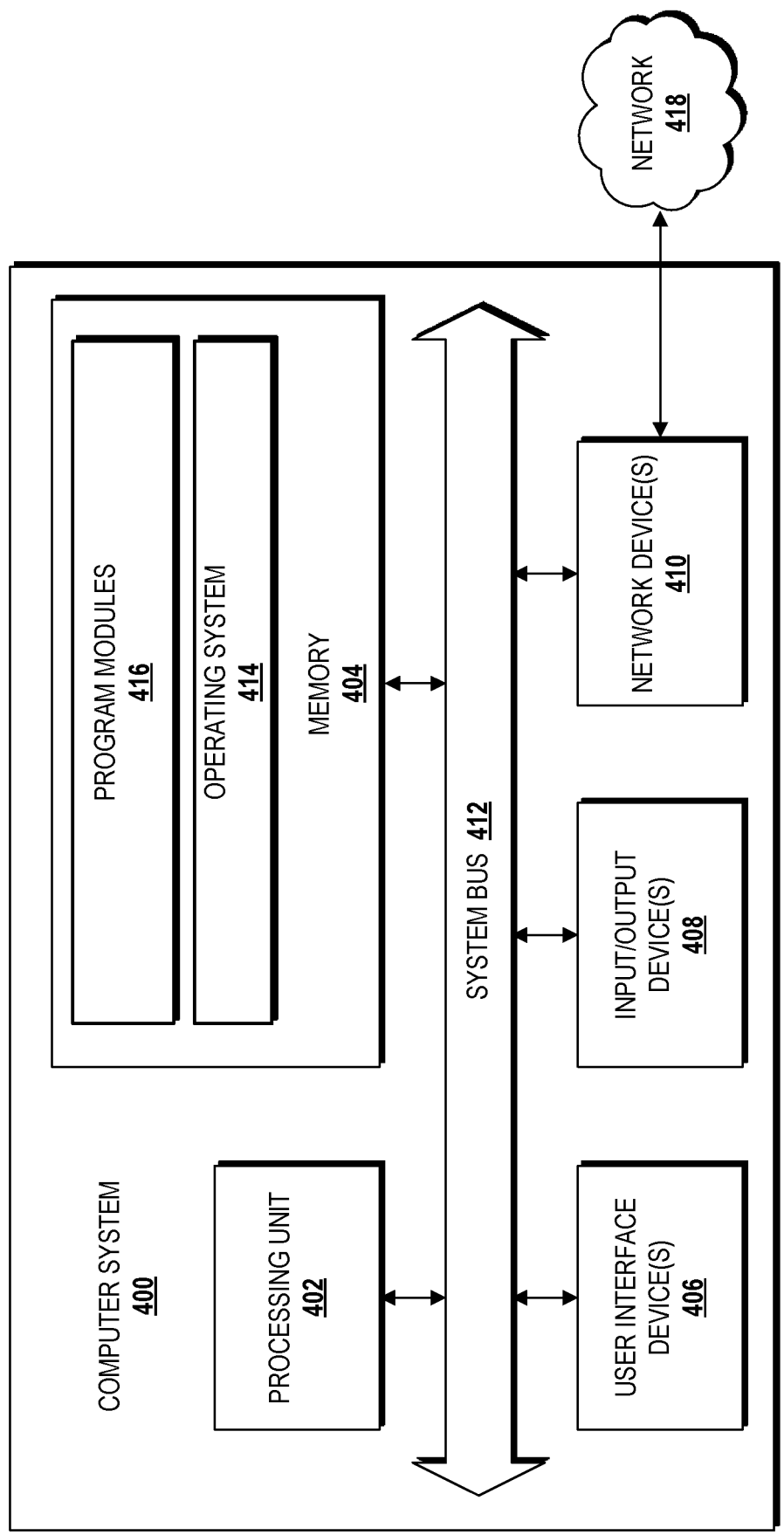
FIG. 4 is a block diagram illustrating an example computer system capable of implementing aspects of embodiments presented herein.

Turning now to FIG. 4 is a block diagram illustrating a computer system 400 configured to provide the functionality in accordance with various embodiments of the concepts and technologies disclosed herein. The systems, devices, and other components disclosed herein can utilize, at least in part, an architecture that is the same as or at least similar to the architecture of the computer system 400. In some embodiments, one or more of the P-GW/PCEF 108, PCRF 110, the P-CSCF 114, the DNS 116, the I-CSCF 118, the S-CSCF 122, the ENUM server 126, the HSS 120, the TAS 124, the NGBE 152, the SIP PSX 162, and/or the IPBE 164 can be configured like the computer system 400. It should be understood, however, that modification to the architecture may be made to facilitate certain interactions among elements described herein.

The computer system 400 includes a processing unit 402, a memory 404, one or more user interface devices 406, one or more input/output ("I/O") devices 408, and one or more network devices 410, each of which is operatively connected to a system bus 412. The system bus 412 enables bi-directional communication between the processing unit 402, the memory 404, the user interface devices 406, the I/O devices 408, and the network devices 410.

The processing unit 402 may be a standard central processor that performs arithmetic and logical operations, a more specific purpose programmable logic controller ("PLC"), a programmable gate array, or other type of processor known to those skilled in the art and suitable for controlling the operation of the server computer. Processing units are generally known, and therefore are not described in further detail herein.

The memory 404 communicates with the processing unit 402 via the system bus 412. In some embodiments, the memory 404 is operatively connected to a memory controller (not shown) that enables communication with the processing unit 402 via the system bus 412. The illustrated memory 404 includes an operating system 414 and one or more program modules 416. The operating system 414 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, OS X, and/or iOS families of operating systems from APPLE CORPORATION, the FREEBSD family of operating systems, the SOLARIS family of operating systems from ORACLE CORPORATION, the ANDROID family of operating systems from ALPHABET INCORPORATED, the QNX family of operating systems from BLACKBERRY LIMITED, other operating systems, and the like.

The program modules 416 may include various software and/or program modules to perform the various operations described herein. In some embodiments, for example, the program modules 416 can include aspects of the originating network 102 and/or the receiving network 148, such as for example without limitation, the P-CSCF 114, the I-CSCF 118, the S-CSCF 122, the HD-V FMC service 127, the P-GW/PCEF 108, and/or other program modules. These and/or other programs can be embodied in computer-readable media containing instructions that, when executed by the processing unit 402, perform one or more of the method 200 described in detail above with respect to FIG. 2. According to some embodiments, the program modules 416 may be embodied in hardware, software, firmware, or any combination thereof. Although not shown in FIG. 4, it should be understood that the memory 404 also can be configured to store the NPM 128, the CRD IS 130, the calling vocoder list 140, the called vocoder list 160, the ATI A 154, the ATI B 156, the ATI C 158, the AVP A 186, the AVP B 188, the AVP C 190, the subscriber profile 121 and/or other data, if desired.

By way of example, and not limitation, computer-readable media may include any available computer storage media or communication media that can be accessed by the computer system 400. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 400. In the claims, the phrase "computer storage medium" and variations thereof does not include waves or signals per se and/or communication media.

The user interface devices 406 may include one or more devices with which a user accesses the computer system 400. The user interface devices 406 may include, but are not limited to, computers, servers, PDAs, cellular phones, or any suitable computing devices. The I/O devices 408 enable a user to interface with the program modules 416. In one embodiment, the I/O devices 408 are operatively connected to an I/O controller (not shown) that enables communication with the processing unit 402 via the system bus 412. The I/O devices 408 may include one or more input devices, such as, but not limited to, a keyboard, a mouse, or an electronic stylus. Further, the I/O devices 408 may include one or more output devices, such as, but not limited to, a display screen or a printer. In some embodiments, the I/O devices 408 can be used for manual controls for operations to exercise under certain emergency situations.

The network devices 410 enable the computer system 400 to communicate with other networks or remote systems via a network 418, such as the originating network 102 (including the EPC network 106 and/or the IMS network 132), and/or the receiving network 148 (including the VoIP network 150, the PSTN 168, and/or the IP/MPLS network 174). Examples of the network devices 410 include, but are not limited to, a modem, a radio frequency ("RF") or infrared ("IR") transceiver, a telephonic interface, a bridge, a router, or a network card. The network 418 may be or may include a wireless network such as, but not limited to, a Wireless Local Area Network ("WLAN"), a Wireless Wide Area Network ("WWAN"), a Wireless Personal Area Network ("WPAN") such as provided via BLUETOOTH technology, a Wireless Metropolitan Area Network ("WMAN") such as a WiMAX network or metropolitan cellular network. Alternatively, the network 418 may be or may include a wired network such as, but not limited to, a Wide Area Network ("WAN"), a wired Personal Area Network ("PAN"), a wired Metropolitan Area Network ("MAN"), a VoIP network, an IP/MPLS network, a PSTN network, an IMS network, an EPC network, or any other mobile network and/or wireline network.

Figure 5:
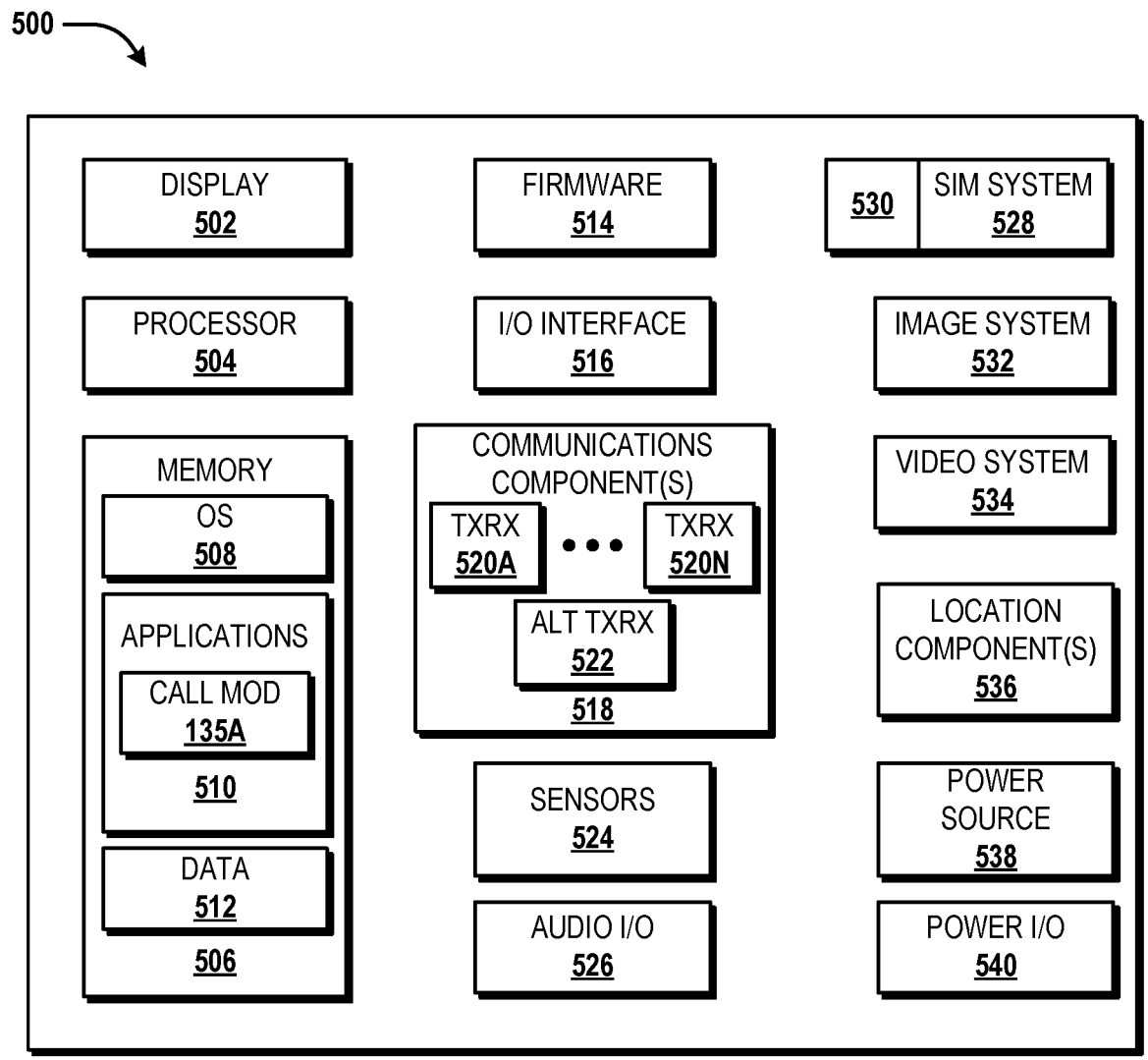
FIG. 5 is a block diagram illustrating an example mobile device capable of implementing aspects of the embodiments disclosed herein.

Turning now to FIG. 5, an illustrative mobile device 500 and components thereof will be described. In some embodiments, one or more of the CD 135 and/or at least one of the plurality of CRDs 170, 176, and 180 (shown in FIG. 1) can be configured like the mobile device 500. While connections are not shown between the various components illustrated in FIG. 5, it should be understood that some, none, or all of the components illustrated in FIG. 5 can be configured to interact with one other to carry out various device functions. In some embodiments, the components are arranged so as to communicate via one or more busses (not shown). Thus, it should be understood that FIG. 5 and the following description are intended to provide a general understanding of a suitable environment in which various aspects of embodiments can be implemented, and should not be construed as being limiting in any way.

As illustrated in FIG. 5, the mobile device 500 can include a display 502 for displaying data. According to various embodiments, the display 502 can be configured to display various graphical user interface ("GUI") elements, text, images, video, virtual keypads and/or keyboards, messaging data, notification messages, metadata, internet content, device status, time, date, calendar data, device preferences, map and location data, combinations thereof, and/or the like.

The mobile device 500 also can include a processor 504 and a memory or other data storage device ("memory") 506. The processor 504 can be configured to process data and/or can execute computer-executable instructions stored in the memory 506. The computer-executable instructions executed by the processor 504 can include, for example, an operating system 508, one or more applications 510, other computer-executable instructions stored in a memory 506, or the like. In some embodiments, the applications 510 also can include a user interface ("UI") application (not illustrated in FIG. 5).

The UI application can interface with the operating system 508 to facilitate user interaction with functionality and/or data stored at the mobile device 500 and/or stored elsewhere. In some embodiments, the operating system 508 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The UI application can be executed by the processor 504 to aid a user in entering content, viewing account information, answering/initiating calls via input of a called telephone number (e.g., the called telephone number 138), entering/deleting data, entering and setting local credentials (e.g., user IDs and passwords) for device access, configuring settings, manipulating address book content and/or settings, multimode interaction, interacting with other applications 510, and otherwise facilitating user interaction with the operating system 508, the applications 510, and/or other types or instances of data 512 that can be stored at the mobile device 500. The data 512 can include, for example, one or more identifiers, and/or other applications or program modules. In some embodiments, the data 512 can include one or more of the calling vocoder list 140, the calling vocoders 142, the called vocoder list 160, and/or any of the called vocoders (e.g., the called vocoders A 172, the called vocoders B 178, and the called vocoders C 182), or other data sent among and/or between the originating network 102 and the receiving network 148. According to various embodiments, the applications 510 can include, for example, presence applications, visual voice mail applications, messaging applications, text-to-speech and speech-to-text applications, add-ons, plug-ins, email applications, music applications, video applications, camera applications, location-based service applications, power conservation applications, game applications, productivity applications, entertainment applications, enterprise applications, combinations thereof, and the like. In some embodiments, the applications 510 can include a call application module 135A that can be resident on the CD 135 and/or any of the CRDs 170, 176, and/or 180 to facilitate participation in voice communications during a call session. The applications 510, the data 512, and/or portions thereof can be stored in the memory 506 and/or in a firmware 514, and can be executed by the processor 504. The firmware 514 also can store code for execution during device power up and power down operations. It can be appreciated that the firmware 514 can be stored in a volatile or non-volatile data storage device including, but not limited to, the memory 506 and/or a portion thereof.

The mobile device 500 also can include an input/output ("I/O") interface 516. The I/O interface 516 can be configured to support the input/output of data such as location information, user information, organization information, presence status information, user IDs, passwords, and application initiation (start-up) requests. In some embodiments, the I/O interface 516 can include a hardwire connection such as USB port, a mini-USB port, a micro-USB port, an audio jack, a PS2 port, an IEEE 1394 ("FIREWIRE") port, a serial port, a parallel port, an Ethernet (RJ45) port, an RHO port, a proprietary port, combinations thereof, or the like. In some embodiments, the mobile device 500 can be configured to synchronize with another device to transfer content to and/or from the mobile device 500. In some embodiments, the mobile device 500 can be configured to receive updates to one or more of the applications 510 via the I/O interface 516, though this is not necessarily the case. In some embodiments, the I/O interface 516 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 516 may be used for communications between the mobile device 500 and a network device or local device.

The mobile device 500 also can include a communications component 518. The communications component 518 can be configured to interface with the processor 504 to facilitate wired and/or wireless communications with one or more networks such as one or more IP access networks and/or one or more circuit access networks. In some embodiments, other networks include networks that utilize non-cellular wireless technologies such as WI-FI or WIMAX. In some embodiments, the communications component 518 includes a multimode communications subsystem for facilitating communications via the cellular network and one or more other networks.

The communications component 518, in some embodiments, includes one or more transceivers. The one or more transceivers, if included, can be configured to communicate over the same and/or different wireless technology standards with respect to one another. For example, in some embodiments one or more of the transceivers of the communications component 518 may be configured to communicate using Global System for Mobile communications ("GSM"), Code Division Multiple Access ("CDMA") ONE, CDMA2000, Long-Term Evolution ("LTE"), and various other 2G, 2.5G, 3G, 4G, and greater generation technology standards. Moreover, the communications component 518 may facilitate communications over various channel access methods (which may or may not be used by the aforementioned standards) including, but not limited to, Time-Division Multiple Access ("TDMA"), Frequency-Division Multiple Access ("FDMA"), Wideband CDMA ("W-CDMA"), Orthogonal Frequency-Division Multiplexing ("OFDM"), Space-Division Multiple Access ("SDMA"), and the like.

In addition, the communications component 518 may facilitate data communications using Generic Packet Radio Service ("GPRS"), Enhanced Data Rates for Global Evolution ("EDGE"), the High-Speed Packet Access ("HSPA") protocol family including High-Speed Download Packet Access ("HSDPA"), Enhanced Uplink ("EUL") or otherwise termed High-Speed Upload Packet Access ("HSUPA"), HSPA+, and various other current and future wireless data access standards. In the illustrated embodiment, the communications component 518 can include a first transceiver ("TxRx") 520A that can operate in a first communications mode (e.g., GSM). The communications component 518 also can include an $N^{th}$ transceiver ("TxRx") 520N that can operate in a second communications mode relative to the first transceiver 520A (e.g., UMTS). While two transceivers 520A-520N (hereinafter collectively and/or generically referred to as "transceivers 520") are shown in FIG. 5, it should be appreciated that less than two, two, and/or more than two transceivers 520 can be included in the communications component 518.

The communications component 518 also can include an alternative transceiver ("Alt TxRx") 522 for supporting other types and/or standards of communications. According to various contemplated embodiments, the alternative transceiver 522 can communicate using various communications technologies such as, for example, WI-FI, WIMAX, BLUETOOTH, infrared, infrared data association ("IRDA"), near-field communications ("NFC"), ZIGBEE, other radio frequency ("RF") technologies, combinations thereof, and the like.

In some embodiments, the communications component 518 also can facilitate reception from terrestrial radio networks, digital satellite radio networks, internet-based radio service networks, combinations thereof, and the like. The communications component 518 can process data from a network such as the Internet, an intranet, a broadband network, a WI-FI hotspot, an Internet service provider ("ISP"), a digital subscriber line ("DSL") provider, a broadband provider, combinations thereof, or the like.

The mobile device 500 also can include one or more sensors 524. The sensors 524 can include temperature sensors, light sensors, air quality sensors, movement sensors, orientation sensors, noise sensors, proximity sensors, or the like. As such, it should be understood that the sensors 524 can include, but are not limited to, accelerometers, magnetometers, gyroscopes, infrared sensors, noise sensors, microphones, combinations thereof, or the like. Additionally, audio capabilities for the mobile device 500 may be provided by an audio I/O component 526. The audio I/O component 526 of the mobile device 500 can include one or more speakers for the output of audio signals, one or more microphones for the collection and/or input of audio signals, and/or other audio input and/or output devices.

The illustrated mobile device 500 also can include a subscriber identity module ("SIM") system 528. The SIM system 528 can include a universal SIM ("USIM"), a universal integrated circuit card ("UICC") and/or other identity devices. The SIM system 528 can include and/or can be connected to or inserted into an interface such as a slot interface 530. In some embodiments, the SIM 136 can be configured to be substantially similar to the Sim system 528. In some embodiments, the slot interface 530 can be configured to accept insertion of other identity cards or modules for accessing various types of networks. Additionally, or alternatively, the slot interface 530 can be configured to accept multiple subscriber identity cards. Because other devices and/or modules for identifying users and/or the mobile device 500 are contemplated, it should be understood that these embodiments are illustrative, and should not be construed as being limiting in any way.

The mobile device 500 also can include an image capture and processing system 532 ("image system"). The image system 532 can be configured to capture or otherwise obtain photos, videos, and/or other visual information. As such, the image system 532 can include cameras, lenses, charge-coupled devices ("CCDs"), combinations thereof, or the like. The mobile device 500 may also include a video system 534. The video system 534 can be configured to capture, process, record, modify, and/or store video content. Photos and videos obtained using the image system 532 and the video system 534, respectively, may be added as message content to an MMS message, email message, and sent to another mobile device. The video and/or photo content also can be shared with other devices via various types of data transfers via wired and/or wireless communication devices as described herein.

The mobile device 500 also can include one or more location components 536. The location components 536 can be configured to send and/or receive signals to determine a geographic location of the mobile device 500. According to various embodiments, the location components 536 can send and/or receive signals from global positioning system ("GPS") devices, assisted GPS ("A-GPS") devices, WI-FI/WIMAX and/or cellular network triangulation data, combinations thereof, and the like. The location component 536 also can be configured to communicate with the communications component 518 to retrieve triangulation data for determining a location of the mobile device 500. In some embodiments, the location component 536 can interface with cellular network nodes, telephone lines, satellites, location transmitters and/or beacons, wireless network transmitters and receivers, combinations thereof, and the like. In some embodiments, the location component 536 can include and/or can communicate with one or more of the sensors 524 such as a compass, an accelerometer, and/or a gyroscope to determine the orientation of the mobile device 500. Using the location component 536, the mobile device 500 can generate and/or receive data to identify its geographic location, or to transmit data used by other devices to determine the location of the mobile device 500. The location component 536 may include multiple components for determining the location and/or orientation of the mobile device 500.

The illustrated mobile device 500 also can include a power source 538. The power source 538 can include one or more batteries, power supplies, power cells, and/or other power subsystems including alternating current ("AC") and/or direct current ("DC") power devices. The power source 538 also can interface with an external power system or charging equipment via a power I/O component 540. Because the mobile device 500 can include additional and/or alternative components, the above embodiment should be understood as being illustrative of one possible operating environment for various embodiments of the concepts and technologies described herein. The described embodiment of the mobile device 500 is illustrative, and should not be construed as being limiting in any way.

Based on the foregoing, it should be appreciated that concepts and technologies directed to a High-Definition Voice for Fixed Mobile Convergence on mobile and wireline networks have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

What is claimed is:

1. A method comprising:
  detecting, by a system executing within an originating network, a call request associated with a called telephone number to setup a call session, wherein the call request is initiated from a calling device associated with the originating network;
  receiving, by the system executing within the originating network, from an electronic number mapping system, a network presence map identifying a plurality of call receiving devices associated with the called telephone number that are available to participate in the call session via a receiving network; and
  negotiating, by the system executing within the originating network, vocoder selection for the call session to facilitate selection of a calling vocoder for the calling device to use during the call session and a respective called vocoder for each of the plurality of call receiving devices to use during the call session prior to one of the plurality of call receiving devices participating in the call session with the calling device.

2. The method of claim 1, further comprising preparing, by the system within the originating network, a calling vocoder list identifying at least the calling vocoder, wherein the calling vocoder is supported by the calling device.

3. The method of claim 2, wherein negotiating the vocoder selection for the call session comprises:
  providing, from the originating network, the network presence map and the calling vocoder list to a network gateway border element of the receiving network;
  obtaining, from the receiving network, a called vocoder list identifying called vocoders that are supported by the plurality of call receiving devices, wherein the called vocoders comprise the respective called vocoder for each of the plurality of call receiving devices; and
  assigning, by the system of the originating network, based on the calling vocoder list and the called vocoder list, the calling vocoder for the calling device to use during the call session and the respective called vocoder for each call receiving device of the plurality of call receiving devices to use during the call session.

4. The method of claim 3, wherein the calling vocoder and the respective called vocoder being assigned are based on an amount of transcoding iterations that would occur along a call path between the originating network and the receiving network.

5. The method of claim 3, further comprising:
  identifying, from the receiving network, the call receiving device of the plurality of call receiving devices that will participate in the call session; and
  activating, via the originating network, the calling vocoder for the calling device to use during the call session with the call receiving device that will participate in the call session.

6. The method of claim 5, further comprising:
  tracking, via the electronic number mapping system, at least one of the plurality of call receiving devices associated with the called telephone number to update the network presence map;

determining, via the electronic number mapping system, that a new call receiving device is being requested for use during the call session; and renegotiating, between the originating network and the receiving network, vocoder selection for the calling device and the new call receiving device based on the calling vocoder in use during the call session.

7. The method of claim 1, wherein the originating network includes an internet protocol multimedia subsystem and an evolved packet core network, and wherein the receiving network includes at least one of a voice over internet protocol network and a public switched telephone network.

8. A system comprising:
a processor; and
a memory storing computer-executable instructions that, in response to being executed by the processor, cause the processor to perform operations comprising:
  detecting a call request associated with a called telephone number to setup a call session, wherein the call request is initiated from a calling device associated with an originating network,
  receiving, from an electronic number mapping system, a network presence map identifying a plurality of call receiving devices associated with the called telephone number that are available to participate in the call session via a receiving network, and
  negotiating vocoder selection for the call session to facilitate selection of a calling vocoder for the calling device to use during the call session and a respective called vocoder for each of the plurality of call receiving devices to use during the call session prior to one of the plurality of call receiving devices participating in the call session with the calling device.

9. The system of claim 8, wherein the operations further comprise preparing a calling vocoder list identifying at least the calling vocoder, wherein the calling vocoder is supported by the calling device.

10. The system of claim 9, wherein negotiating vocoder selection for the call session comprises:
providing the network presence map and the calling vocoder list to a network gateway border element of the receiving network;
obtaining a called vocoder list identifying called vocoders that are supported by the plurality of call receiving devices, wherein the called vocoders comprise the respective called vocoder for each of the plurality of call receiving devices; and
assigning, based on the calling vocoder list and the called vocoder list, the calling vocoder for the calling device to use during the call session and the respective called vocoder for each call receiving device of the plurality of call receiving devices to use during the call session.

11. The system of claim 10, wherein the calling vocoder and the respective called vocoder being assigned are based on an amount of transcoding iterations that would occur along a call path between the originating network and the receiving network.

12. The system of claim 10, wherein the operations further comprise:
identifying the call receiving device of the plurality of call receiving devices that will participate in the call session; and
activating the respective calling vocoder for the calling device to use during the call session with the call receiving device that will participate in the call session.

13. The system of claim 12, wherein the operations further comprise:
tracking at least one of the plurality of call receiving devices associated with the called telephone number to update the network presence map;
determining that a new call receiving device is being requested for use during the call session; and
renegotiating vocoder selection for the calling device and the new call receiving device based on the calling vocoder in use during the call session.

14. The system of claim 8, wherein the originating network includes an internet protocol multimedia subsystem and an evolved packet core network, and wherein the receiving network includes at least one of a voice over internet protocol network and a public switched telephone network.

15. A computer storage medium having computer-executable instructions stored thereon that, in response to execution by a processor of a system, cause the processor to perform operations comprising:
detecting a call request associated with a called telephone number to setup a call session, wherein the call request is initiated from a calling device associated with an originating network;
receiving, from an electronic number mapping system, a network presence map identifying a plurality of call receiving devices associated with the called telephone number that are available to participate in the call session via a receiving network; and
negotiating vocoder selection for the call session to facilitate selection of a calling vocoder for the calling device to use during the call session and a respective called vocoder for each of the plurality of call receiving devices to use during the call session prior to one of the plurality of call receiving devices participating in the call session with the calling device.

16. The computer storage medium of claim 15, wherein the operations further comprise the calling vocoder, wherein the calling vocoder is supported by the calling device.

17. The computer storage medium of claim 16, wherein negotiating the vocoder selection for the call session comprises:
providing the network presence map and the calling vocoder list to a network gateway border element of the receiving network;
obtaining a called vocoder list identifying called vocoders that are supported by the plurality of call receiving devices, wherein the called vocoders comprise the respective called vocoder for each of the plurality of call receiving devices; and
assigning, based on the calling vocoder list and the called vocoder list, the calling vocoder for the calling device to use during the call session and the respective called vocoder for each call receiving device of the plurality of call receiving devices to use during the call session.

18. The computer storage medium of claim 17, wherein the calling vocoder and the respective called vocoder being assigned are based on an amount of transcoding iterations that would occur along a call path between the originating network and the receiving network.

19. The computer storage medium of claim 18, wherein the operations further comprise:
identifying the call receiving device of the plurality of call receiving devices that will participate in the call session;

activating the calling vocoder for the calling device to use during the call session with the call receiving device that will participate in the call session;

tracking at least one of the plurality of call receiving devices associated with the called telephone number to update the network presence map;

determining that a new call receiving device is being requested for use during the call session; and renegotiating vocoder selection for the calling device and the new call receiving device based on the calling vocoder in use during the call session.

20. The computer storage medium of claim 15, wherein the originating network includes an internet protocol multimedia subsystem and an evolved packet core network, and wherein the receiving network includes at least one of a voice over internet protocol network and a public switched telephone network.

\* \* \* \* \*